United States Patent
Yoshihara et al.

(10) Patent No.: US 7,724,267 B2
(45) Date of Patent: May 25, 2010

(54) INFORMATION PROCESSING PROGRAM AND INFORMATION PROCESSING APPARATUS

(75) Inventors: Kazuki Yoshihara, Kyoto (JP); Tetsuya Watanabe, Tokyo (JP); Tomoya Takahashi, Tokyo (JP)

(73) Assignees: Nintendo Co., Ltd., Kyoto-shi (JP); Game Freak, Inc., Tokyo (JP)

( * ) Notice: Subject to any disclaimer, the term of this patent is extended or adjusted under 35 U.S.C. 154(b) by 707 days.

(21) Appl. No.: 11/636,445

(22) Filed: Dec. 11, 2006

(65) Prior Publication Data

US 2008/0122863 A1 May 29, 2008

(30) Foreign Application Priority Data

Sep. 26, 2006 (JP) ............... 2006-260623

(51) Int. Cl.
    *G09G 5/00* (2006.01)
(52) U.S. Cl. .................. 345/650; 345/156; 345/157; 345/649
(58) Field of Classification Search ............. 345/184, 345/156, 157, 649, 650; 434/92
    See application file for complete search history.

(56) References Cited

U.S. PATENT DOCUMENTS

| | | | | |
|---|---|---|---|---|
| 5,019,809 A | * | 5/1991 | Chen ..................... 340/815.42 |
| 5,691,747 A | * | 11/1997 | Amano ..................... 345/167 |
| 5,936,628 A | * | 8/1999 | Kitamura et al. ............. 345/420 |
| 5,956,045 A | * | 9/1999 | Gotoh et al. ................. 345/655 |
| 6,075,468 A | * | 6/2000 | Sugiyama ...................... 341/5 |
| 6,278,440 B1 | * | 8/2001 | Katsurahira et al. .......... 345/163 |
| 6,937,227 B2 | * | 8/2005 | Qamhiyah et al. .......... 345/157 |
| 7,133,024 B2 | * | 11/2006 | Drake ......................... 345/157 |
| 7,429,978 B2 | * | 9/2008 | Yoshioka .................... 345/169 |
| 2004/0052016 A1 | * | 3/2004 | Takagi et al. ................... 361/51 |
| 2006/0026521 A1 | * | 2/2006 | Hotelling et al. ............. 715/702 |
| 2006/0026535 A1 | * | 2/2006 | Hotelling et al. ............. 715/863 |

FOREIGN PATENT DOCUMENTS

| | | |
|---|---|---|
| JP | 4-48318 | 2/1992 |
| JP | 2002-222034 | 8/2002 |

* cited by examiner

*Primary Examiner*—M Good Johnson
(74) *Attorney, Agent, or Firm*—Nixon & Vanderhye P.C.

(57) ABSTRACT

An information processing apparatus has a pointing device for designating a position of an arbitrary point with respect to a reference point O, and a processor of the information processing apparatus detects a position of the point designated by the pointing device with respect to the reference point O at every unit of time, and calculates an operation vector AB respectively regarding a point A and a point B detected before and after as a starting point and an ending point. The calculated operation vector AB is orthogonally-projected onto a strait line vertical to a vector OA respectively regarding the reference point O and the point A as a starting point and an ending point. Information processing is performed on the basis of a component vector thus obtained from the operation vector AB.

20 Claims, 19 Drawing Sheets

FIG. 7
(A)
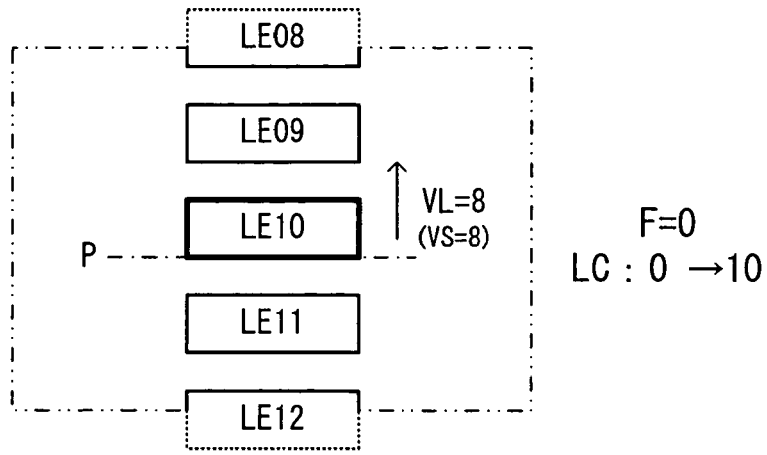
(B)
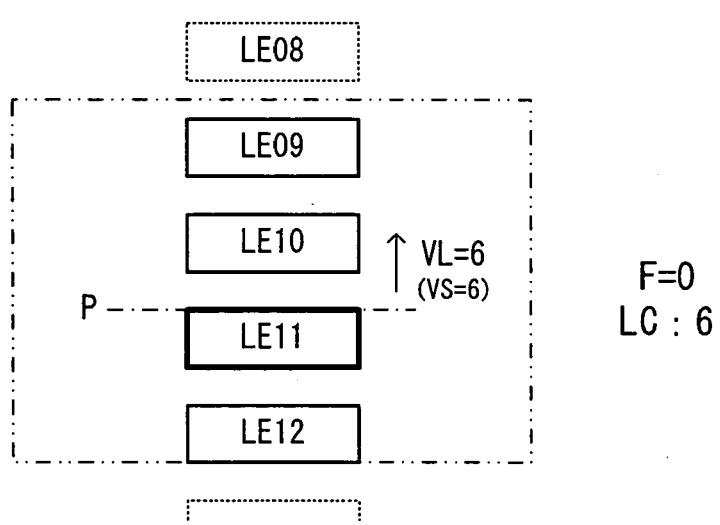
(C)
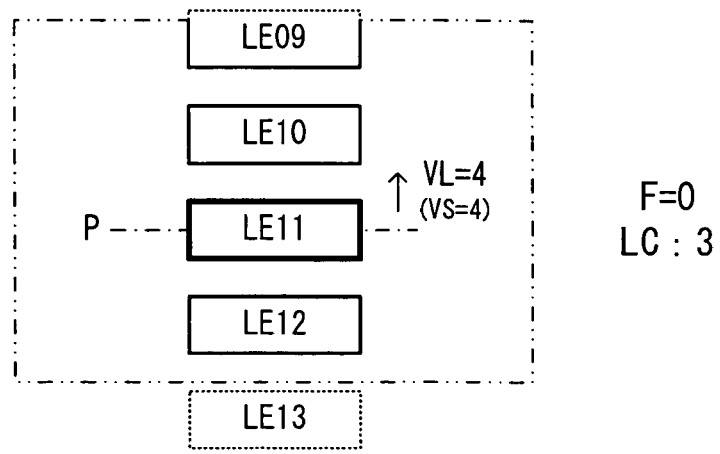

FIG. 8
(A)
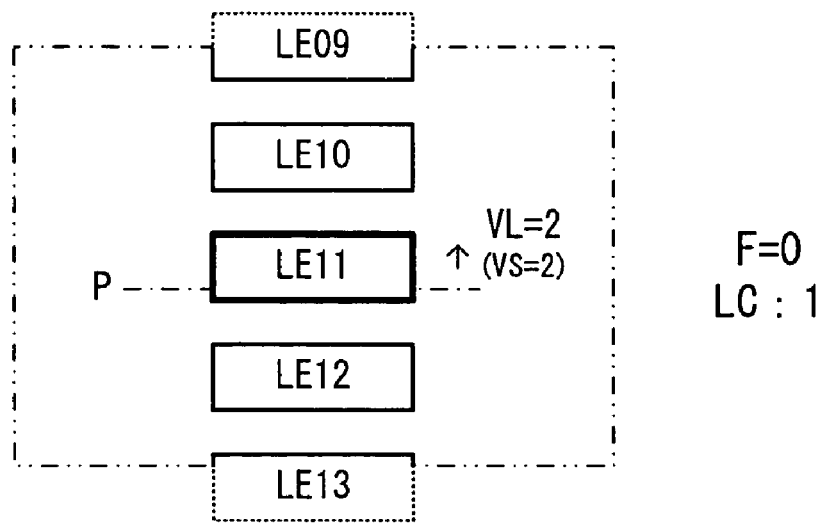
(B)
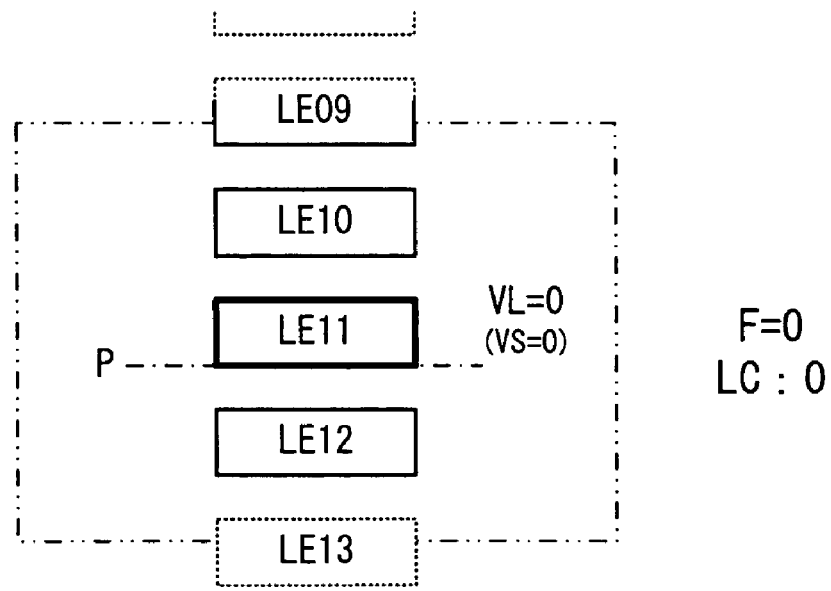

FIG. 9
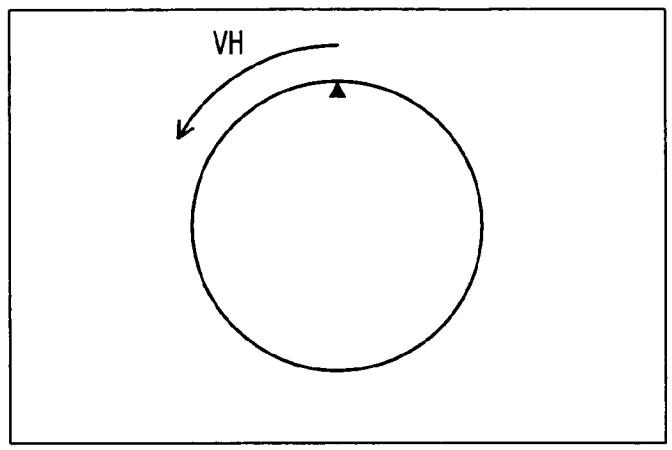
(A) F=0 LC : 3
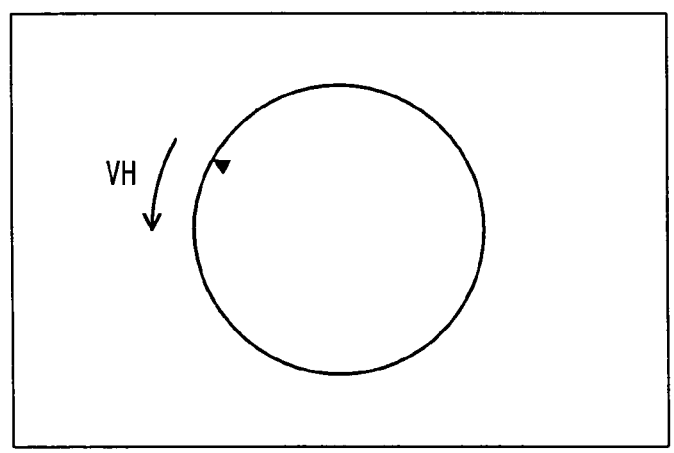
(B) F=0 LC : 1
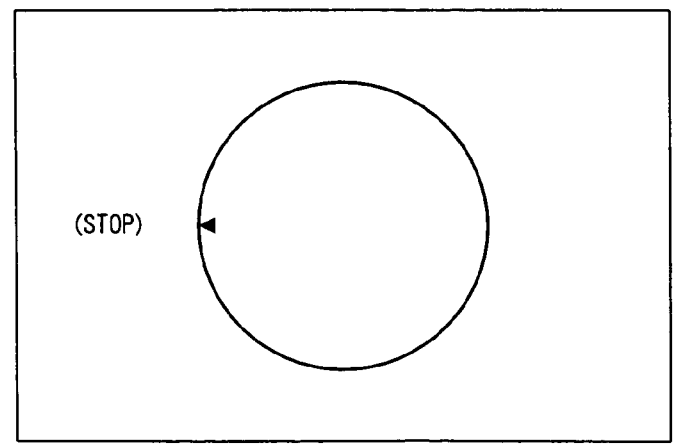
(C) F=0 LC : 0

FIG. 11
(A) 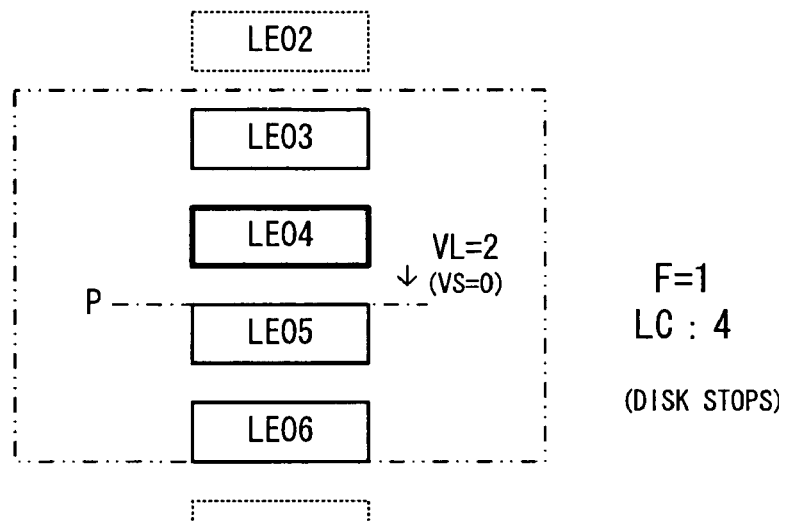
(B) 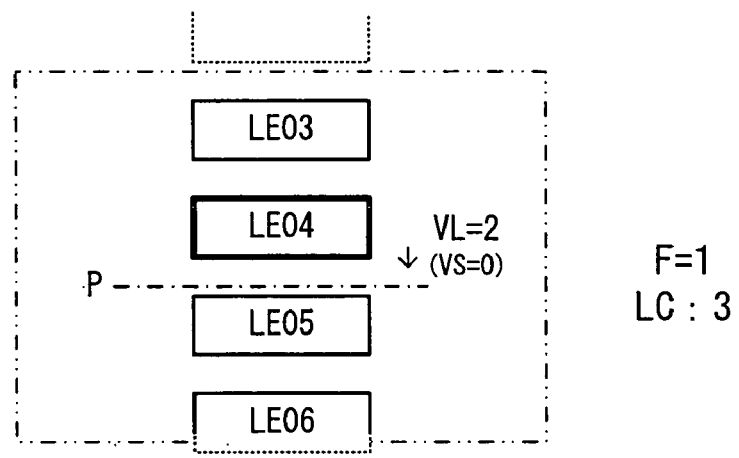
(C) 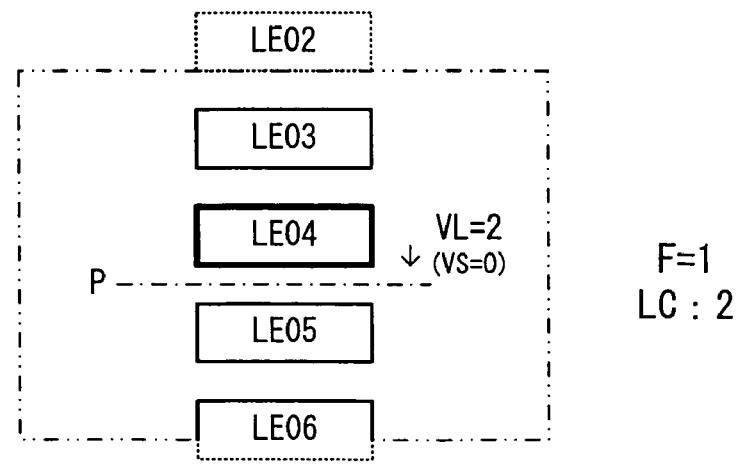

FIG. 12
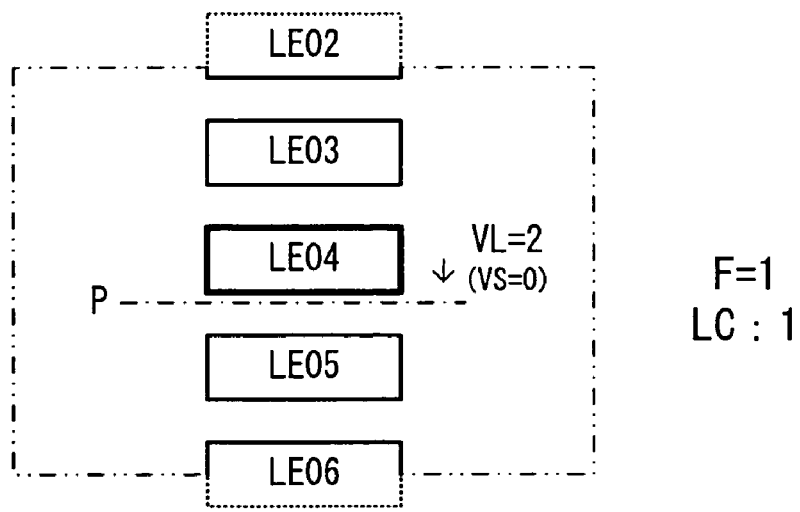
(A)
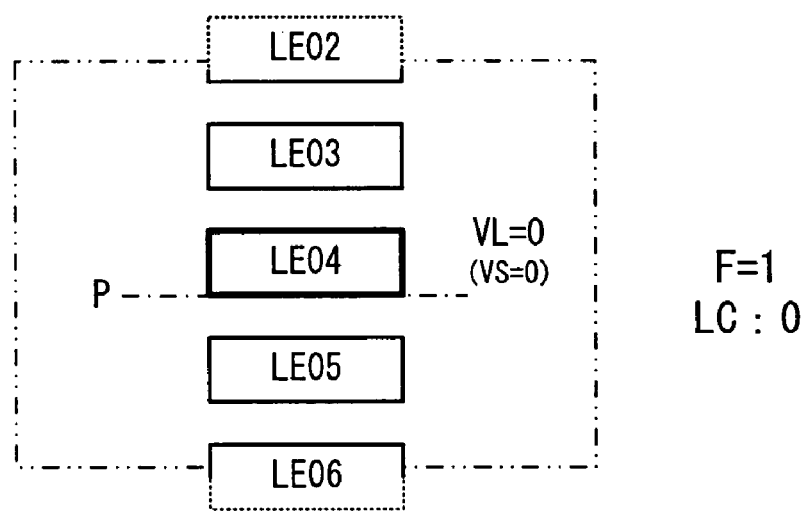
(B)

INFORMATION PROCESSING PROGRAM AND INFORMATION PROCESSING APPARATUS

CROSS REFERENCE OF RELATED APPLICATION

The disclosure of Japanese Patent Application No. 2006-260623 is incorporated herein by reference.

BACKGROUND

1. Field

Example embodiments of the presently described technology relate to information processing programs and information processing apparatuses. More specifically, present example embodiments relate to an information processing program and an information processing apparatus which detect a rotating operation on the basis of the changes of the positions (vector) designated by pointing devices, such as a touch panel, a tablet, a mouse, etc., obtains a controlled variable (signed scalar) from the detected rotating operation, and performs information processing on the basis of the obtained controlled variable.

2. Description of the Related Art

As conventional programs or apparatuses of such kind, one disclosed in Patent Laying-open No. 4-48318 (Patent Document 1) has been known. In the related art, a rotating operation respectively taking a first point (A) and a second point (B) as a starting point and an ending point is detected. Then, an angle between a direction from the reference point (O) to the first point and a direction from the reference point to the second point (rotation angle AOB) is obtained to scroll a screen by page by the amount corresponding to the obtained rotation angle.

Furthermore, one disclosed in Japanese Patent Laying-open No. 2002-222034 (Patent Document 2) has also been known. In the related art, a first point (A), a second point (B), a third point (C) . . . are sequentially detected. A displacement angle which a line segment BC forms with a line segment AB is first evaluated. Similarly, displacement angles between two adjacent line segments are sequentially obtained onward so as to be accumulated. Then, if the accumulated displacement angle is equal to or more than a threshold value, it is recognized that a rotating operation is performed to scroll the screen by the accumulated displacement angle.

However, as the related art in Patent Document 1, if the rotation angle AOB with respect to the reference point O is a controlled variable, even the same travel distance (operation amount) from the point A to the point B results in difference in the controlled variable depending on the distances from the reference point O to each of the points A and B. Thus, an operator has to adjust an operation amount by taking the distances from the reference point into consideration whenever he or she wants to perform a desired information processing.

On the other hand, as the related art in Patent Document 2, if the accumulated displacement angle is a controlled variable, until at least three points are detected, and the accumulated displacement angle above the threshold value is obtained, it is not recognized that a rotating operation is performed, and information processing is also not started. That is, a low response to the rotating operation occurs.

SUMMARY

Therefore, it is a primary aspect of the present example embodiments to provide a novel information processing program and information processing apparatus.

Another aspect of the present example embodiments is to provide information processing program and an information processing apparatus which are able to precisely and responsively perform information processing on a rotating operation.

An information processing program according to the first example embodiment causes a processor (42: reference numeral designating a portion corresponding in the embodiments and so forth) of an information processing apparatus (10) with a pointing device (20) for designating a position of an arbitrary point to execute following steps of: a position detecting step (S5) for detecting a position designated by the pointing device with respect to a reference point (O) at every unit of time; an operation vector calculating step (S45) of calculating an operation vector respectively regarding a first point and a second point detected before and after by the position detecting step as a starting point and an ending point; an orthogonally-projecting step (S47-S51) of orthogonally-projecting the operation vector calculated by the operation vector calculating step onto a straight line vertical to the first vector respectively regarding the reference point and the first point as a starting point and an ending point; and an information processing step (S11-S23) of processing information on the basis of component vector obtained from the operation vector by the orthogonally-projecting processing in the orthogonally-projecting step.

In the first example embodiment, the position of the point designated by the pointing device with respect to the reference point is detected by a position detecting step at every unit of time. When a first point and a second point are sequentially detected by the position detecting step, an operation vector respectively regarding the first point and the second point as a starting point and an ending point is calculated by an operation vector calculating step. An orthogonally-projecting step orthogonally-projects the operation vector thus calculated onto a straight line vertical to the first vector respectively regarding the reference point and the first point as a starting point and an ending point. By the orthogonally-projecting processing, component vector (signed scalar) in a direction vertical to the first vector, that is, component vector tangentially at the starting point on the circumference passing through the starting point and taking the reference point as a center is obtained from the operation vector. An information processing step processes information according to the component vector.

According to the first example embodiment, if a travel distance between the points designated by the pointing device, that is, a operation amount is equal, the same component vector can be obtained regardless of the distances from the reference point to the designated points, and therefore, an operator can perform a desired information processing without adjusting the operation amount by taking the distance from the reference point to the designated points into consideration. Furthermore, by regarding an arbitrary operation as a rotating operation, the component vector is calculated at a time the two points are detected, capable of improving a response.

An information processing program according to the second example embodiment is dependent on the first example embodiment, and the orthogonally-projecting step further includes following steps of: an unit vector calculating step (S47, S49) of calculating an unit vector vertical to the first vector; and an inner product calculating step (S51) of calculating an inner product between the operation vector calculated by the operation vector calculating step and the unit vector calculated by the unit vector calculating step.

In the second example embodiment, when the operation vector is orthogonally-projected onto the straight line vertical to the first vector, the unit vector calculating step calculates an unit vector vertical to the first vector, and an inner product calculating step calculates an inner product between the operation vector calculated by the operation vector calculating step and the unit vector calculated by the unit vector calculating step.

According to the second example embodiment, the absolute value of the inner product corresponds to the size of the component vector, and the sign of the inner product corresponds to the direction of the component vector, and therefore, by calculating at least an inner product, the information processing can be performed.

An information processing program according to the third example embodiment is dependent on the second example embodiment, and further causes the processor to execute following steps of: an absolute value calculating step (S53) of calculating an absolute value of the calculation by the inner product calculating step; and an outer product calculating step (S43) of calculating an outer product between the first vector and a second vector regarding the reference point and the second point as a starting point and an ending point. The information processing step performs information processing on the basis of the calculation by the absolute value calculating step and the calculation by the outer product calculating step.

In the third example embodiment, an absolute value calculating step calculates an absolute value of the calculation by the inner product calculating step, and an outer product calculating step calculates an outer product between the first vector from the reference point to the first point and the second vector from the reference point to the second point. The information processing step performs information processing on the basis of the calculation by the absolute value calculating step and the calculation by the outer product calculating step.

According to the third example embodiment, as a size of the component vector, the absolute value of the inner product is calculated while as a direction of the component vector, the sign of the outer product of the first vector and the second vector respectively indicating the starting point position and the ending point position of the operation vector is used, and therefore, in comparison with a case that the sign of the inner product is used as a direction of the component vector, it is possible to easily perform the information processing without requiring notice to the direction of the unit vector in calculating the inner product.

An information processing program according to the fourth example embodiment is dependent on claim 1, and the information processing apparatus further comprises a display (14, 12) for displaying an image (72, 70). The information processing step moves the image displayed on the display in a direction corresponding to the orientation of the component vector obtained from the operation vector by an amount corresponding to the size of the component vector.

In the fourth example embodiment, an image is displayed on a display. The image is moved in a direction corresponding to the orientation of the component vector obtained from the operation vector by an amount corresponding to the size of the component vector by the information processing step.

According to the fourth example embodiment, it is possible to precisely and responsively move the image through a rotating operation with the pointing device.

An information processing program according to the fifth example embodiment is dependent on the fourth example embodiment, and the information processing step further includes following steps of: a retaining step (S63) of multiplying the size of the component vector obtained from the operation vector by a constant, and retaining the result of the multiplication as a reference velocity; and a deceleration processing step (S69) of performing deceleration processing on the reference velocity retained by the retaining step at every unit of time.

In the fifth example embodiment, a retaining step multiplies the size of the component vector obtained from the operation vector by a constant, and retains the result of the multiplication as a reference velocity. A deceleration processing step performs deceleration processing on the reference velocity retained by the retaining step at every unit of time. The image is moved on the basis of the reference velocity retained by the retaining step.

According to the fifth example embodiment, by selecting an appropriate constant, it is possible to comfortably move the image. After completion of the operation with the pointing device, the image gradually loses velocity by the deceleration processing, and stops.

An information processing program according to the sixth example embodiment is dependent on the fifth example embodiment, and the information processing step further includes following steps of: a velocity determining step (S67) of determining whether or not the reference velocity retained by the retaining step is equal to or more than a threshold value; and a changing step (S71) of changing the reference velocity to zero when it is determined that the reference velocity is less than the threshold value by the velocity determining step.

In the sixth example embodiment, a velocity determining step determines that the retained reference velocity is equal to or more than a threshold value, and a changing step changes the reference velocity to zero when the reference velocity is less than the threshold value is determined.

According to the sixth example embodiment, the image does not move at the reference velocity below the threshold value, and therefore, it is possible to prevent movements of the image.

An information processing program according to the seventh example embodiment is dependent on the sixth example embodiment, and the information processing step further includes following steps of: a position determining step (S85) of determining whether or not the image exists at a defined position (P) when it is determined that the reference velocity is less than the threshold value by the velocity determining step; and a movement maintaining step (S89) of moving the image to the defined position when it is determined that the image does not exist at the defined position by the position determining step, and then stopping it.

In the seventh example embodiment, when the velocity determining step determines that the reference velocity is less than the threshold value, the position determining step determines whether or not the image exists at the defined position, and when the position determining step determines that the image does not exist at the defined position, a movement maintaining step moves the image to the defined position and stops it.

According to the seventh example embodiment, it is possible to stop the image at the defined position.

An information processing program according to the eighth example embodiment is dependent on the fourth example embodiment. The image includes a first image (72) and a second image (70), and the information processing step includes following steps of: a rotating step (S15, S23) of rotating the first image in a direction corresponding to the orientation of the component vector obtained from the operation vector by an angle corresponding to the size of the component vector; and a translating step (S13, S21) of translating the second image in a direction corresponding to the orientation of the component vector obtained from the operation vector by a distance corresponding to the size of the component vector.

In the eighth example embodiment, the image includes a first image and a second image. The first image is rotated in a direction corresponding to the orientation of the component vector obtained from the operation vector by an angle corresponding to the size of the component vector. The second image is translated in a direction corresponding to the orientation of the component vector obtained from the operation vector by a distance corresponding to the size of the component vector.

According to the eighth example embodiment, a single rotating operation enables the first image to be rotated and the second image to be translated, at the same time.

An information processing apparatus (10) according to the ninth example embodiment comprises: a pointing device (20) for designating a position of an arbitrary point; a position detecting means (S5) for detecting a position designated by the pointing device with respect to a reference point (O) at every unit of time; an operation vector calculating means (S45) for calculating an operation vector respectively regarding a first point and a second point detected before and after by the position detecting means as a starting point and an ending point; an orthogonally-projecting means (S47-S51) for orthogonally-projecting the operation vector calculated by the operation vector calculating step onto a straight line vertical to the first vector respectively regarding the reference point and the first point as a starting point and an ending point; and an information processing means (S11-S23) for processing information on the basis of component vector obtained from the operation vector by the orthogonally-projecting processing in the orthogonally-projecting means.

An information processing method according to the tenth example embodiment is an information processing method of an information processing apparatus (10) with a pointing device (20) for designating a position of an arbitrary point, and comprises: a position detecting step (S5) of detecting a position designated by the pointing device with respect to a reference point (O) at every unit of time; an operation vector calculating step (545) of calculating an operation vector respectively regarding a first point and a second point detected before and after by the position detecting step as a starting point and an ending point; an orthogonally-projecting step (S47-S51) of orthogonally-projecting the operation vector calculated by the operation vector calculating step onto a straight line vertical to the first vector respectively regarding the reference point and the first point as a starting point and an ending point; and an information processing step (S11-S23) of processing information on the basis of component vector obtained from the operation vector by the orthogonally-projecting processing in the orthogonally-projecting step.

In the ninth and tenth example embodiments, similarly to the first example embodiment, it is possible to perform desired information processing without adjusting an operation amount by taking the distances from the designated points to the reference point into consideration, capable of improving a response.

According to the present example embodiments, it is possible to precisely and responsively perform information processing on the rotating operation.

The above described objects and other objects, features, aspects and advantages of the present example embodiments will become more apparent from the following detailed description of the present example embodiments when taken in conjunction with the accompanying drawings.

BRIEF DESCRIPTION OF THE DRAWINGS

FIG. 7 (A)-FIG. 7 (C) are illustrative views showing one example of list traveling processing applied to FIG. 1 in chronologic order;

FIG. 8 (A) and FIG. 8 (B) are illustrative views continued from the processing example in FIG. 7;

FIG. 9 (A)-FIG. 9 (C) are illustrative views showing one example of a wheel rotating processing applied to FIG. 1 embodiment in chronologic order;

FIG. 11 (A)-FIG. 11(C) are illustrative views continued from the processing example shown in FIG. 10;

FIG. 12 (A) and FIG. 12 (B) are illustrative views further continued from the processing example shown in FIG. 10;

DETAILED DESCRIPTION OF NON-LIMITING EXAMPLE EMBODIMENTS

Figure 1:
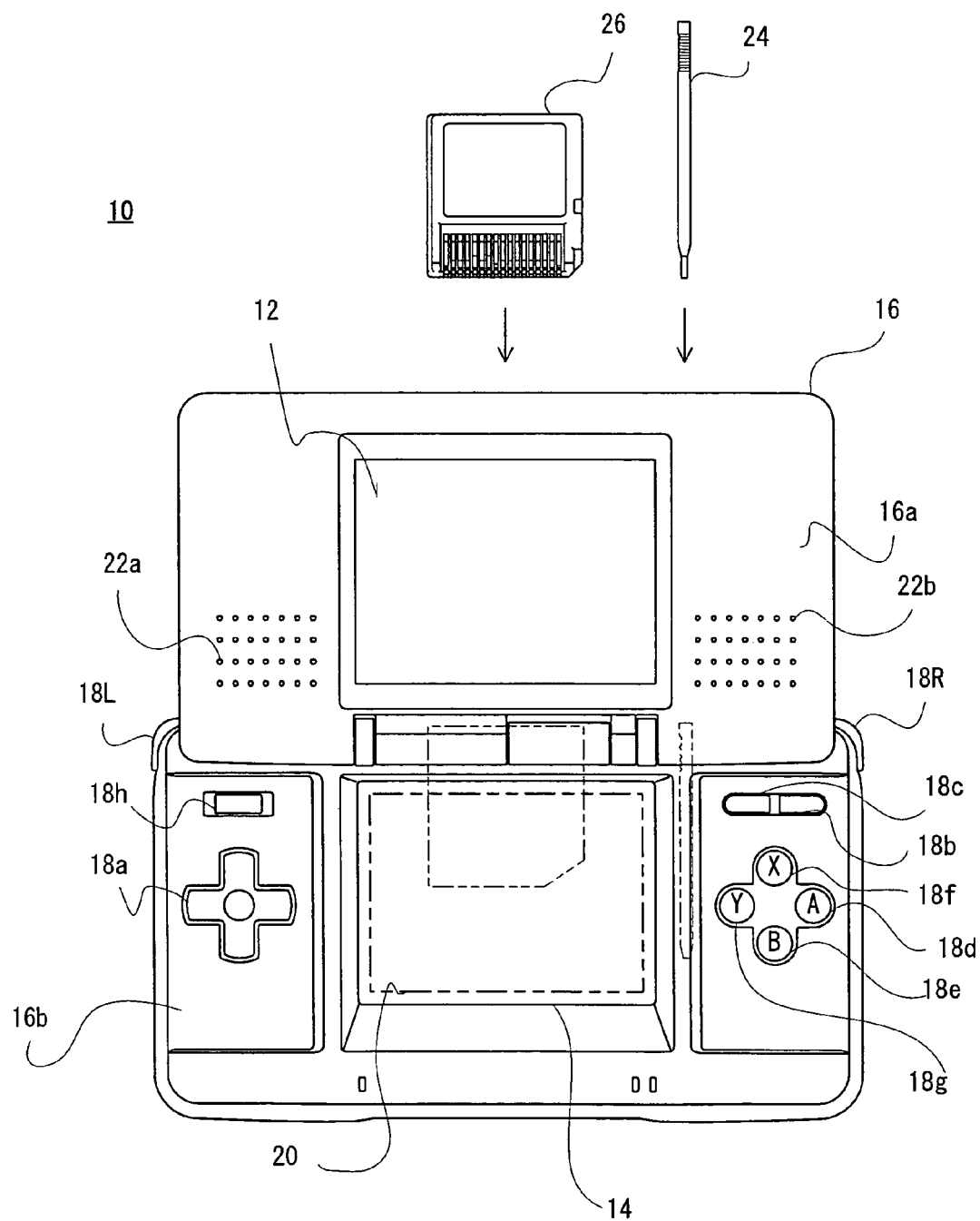
FIG. 1 is an illustrative view showing an appearance of one example embodiment.

Referring to FIG. 1, a game apparatus 10 of one present example embodiment includes a first liquid crystal display (LCD) 12 and a second LCD 14. The LCD 12 and the LCD 14 are provided on a housing 16 so as to be arranged in a predetermined position in the housing 16. In this embodiment, the housing 16 comprises an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

It should be noted that although the LCD is utilized as a display in this embodiment, an EL (Electronic Luminescence) display, etc. may be used in place of the LCD.

As can be understood from FIG. 1, the upper housing 16a has a plane shape larger than a plane shape of the LCD 12, and has an opening formed so as to expose a display surface of the LCD 12 from one main surface thereof. On the other hand, the lower housing 16b has a plane shape the same order of size as the upper housing 16a, and has an opening formed so as to expose a display surface of the LCD 14 at an approximately center of the horizontal direction. Also, on the upper housing 16a, sound release holes 22a and 22b are symmetrically provided by sandwiching the LCD 12 such that the sound release hole 22a is on the right side, and the sound release hole 22b is on the left side. Furthermore, the housing 16 is formed with an operating switch 18 (18a, 18b, 18c, 18d, 18e, 18f, 18h, 18g, 18L and 18R).

In addition, the upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged such as a flaw, etc. It should be noted that the upper housing 16a and the lower housing 16b are not necessarily rotatably connected with each other, and may alternatively be provided integrally (fixedly) to form the housing 16.

The operating switch 18 includes the direction instructing switch (cross switch) 18a, the start switch 18b, the select switch 18c, the action switch (A button) 18d, the action switch (B button) 18e, the action switch (X button) 18f, the action switch (Y button) 18g, the power switch 18h, the action switch (L button) 18L, and the action switch (R button) 18R. The switches 18a and 18h are arranged at the left of the LCD 14 on one surface of the lower housing 16b. The switches 18b to 18g are arranged at the right of the LCD 14 on the one surface of the lower housing 16b. Furthermore, the switch 18L and the switch 18R are respectively arranged at the right and left corners sandwiching the connected portion with the upper housing 16a on the upper side surface (top surface) of the lower housing 16b.

The direction instructing switch 18a functions as a digital joystick, and is utilized for instructing a moving direction of a player character (or player object) to be operated by a player and instructing a moving direction of a cursor, and so forth by operating any one of four depression portions. The start switch 18b is formed by a push button, and is utilized for starting (restarting), temporarily stopping (pausing) a game, and so forth. The select switch 18c is formed by the push button, and utilized for a game mode selection, etc.

The action switch 18d, that is, the A button is formed by the push button, and allows the player character to perform an arbitrary action, except for instructing the direction, such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of acquiring an item, selecting and determining arms or command, etc. The action switch 18e, that is, the B button is formed by the push button, and is utilized for changing a game mode selected by the select switch 18c, canceling an action determined by the A button 18d, and so forth.

The action switch 18e, that is, the X button and the action switch 18f, that is, the Y button are formed by the push button, and are utilized for a subsidiary operation when the game cannot be advanced only with the push button A 22d and the push button B 22e. Of course, the X button and the Y button are not necessarily utilized in the game play. The power switch 18h is a switch for turning on and off the power supply of the game apparatus 10.

The action switch 18L (left depression button) and the action switch 18R (right depression button) are formed by the push button, and the left depression button (L button) 18L and the right depression button (R button) 18R can perform the same operations as the A button 18d and the B button 18e, and also function as a subsidiary of the A button 18d and the B button 18e.

The game apparatus 10 is a game apparatus by means of a touch panel, and attached with a touch panel 20 on a top surface of the LCD 14. As a touch panel 20, any one of kinds of a resistance film system, an optical system (infrared rays system) and an electrostatic capacitive coupling system, for example, can be utilized. In response to an operation by depressing, stroking (touching), and so forth with a stick 24, a pen (stylus pen), or a finger (hereinafter, referred to as "stick or the like 24") on a top surface of the touch panel 20, the touch panel 20 detects a coordinates position of the stick or the like 24 to output coordinates data.

It should be noted that in this embodiment, a resolution of the display surface of the LCD 14 (this is true for the LCD 12) is 228 dots×192 dots, and a detection accuracy of the touch panel 20 is also rendered 228 dots×192 dots in correspondence to the resolution of the display surface. However, the detection accuracy of the touch panel 20 may be lower than the resolution of the display surface, or higher than it.

In this embodiment, on the LCD 14 with the touch panel 20, a game screen to be viewed and operated by the player is displayed, and on the LCD 12, a game screen to be viewed by the player is displayed. More specifically, an image is displayed on the LCD 12 in which an object moves on loci formed by horizontal lines and vertical lines like a lottery (amida-kuji). On the game screen displayed on the LCD 14, only the vertical lines are displayed like an imperfect lottery. A player makes an operation like drawing a horizontal line on the touch panel 20 with respect to the vertical lines displayed on the LCD 14 by directly touching it with the stick or the like 24. Thus, the player draws on the LCD 14 a locus continued from the loci displayed on the LCD 12 to make a locus for leading the moving object to a predetermined position. It should be noted that as to the LCD 14, other various input instructions may be performed depending on the kind of the game. For example, textual information, an icon, or the like may be displayed on the display screen of the LCD 14 to allow a player to select a command.

Thus, the game apparatus 10 has the LCD 12 and the LCD 14 as a display portion of two screens, and by providing the touch panel 20 on a display screen of any one of them (LCD 14 in this embodiment), the game apparatus 10 has the two screens (LCD 12, 14) and the operating portions (18, 20) of two systems.

In addition, in this embodiment, the stick 24 can be housed in the housing portion (housing slot) (not shown) at a position nearer to the side surface (right side) from the center on the upper housing 16a, for example, and taken out as necessary. It should be noted that if the stick 24 is not provided, the housing portion also need not to be provided.

Also, the game apparatus 10 includes a memory card (or game cartridge) 26. The memory card 26 is detachable, and inserted into a loading slot (not shown) provided on a rear surface or an upper edge (side surface) of the lower housing 16b. Although omitted in FIG. 1, a connector 46 (see FIG. 2) is provided at a depth portion of the loading slot for connecting a connector (not shown) provided at an end portion of the memory card 26 in the loading direction, and when the memory card 26 is loaded into the loading slot, the connectors are connected with each other, and therefore, the memory card 26 is accessible by a CPU core 42 (see FIG. 2) of the game apparatus 10.

Although not represented in FIG. 1, inside the lower housing 16b, a right speaker 30a is provided at the position corresponding to the sound release hole 22a, and a left speaker 30b (see FIG. 2) is provided at the position corresponding to the sound release hole 22b.

Furthermore although omitted in FIG. 1, for example, a battery accommodating box is provided on a rear surface of the lower housing 16b, and a volume adjustment knob, an external expansion connector, an earphone jack, etc. are provided on a bottom surface of the lower housing 16b.

Figure 2:
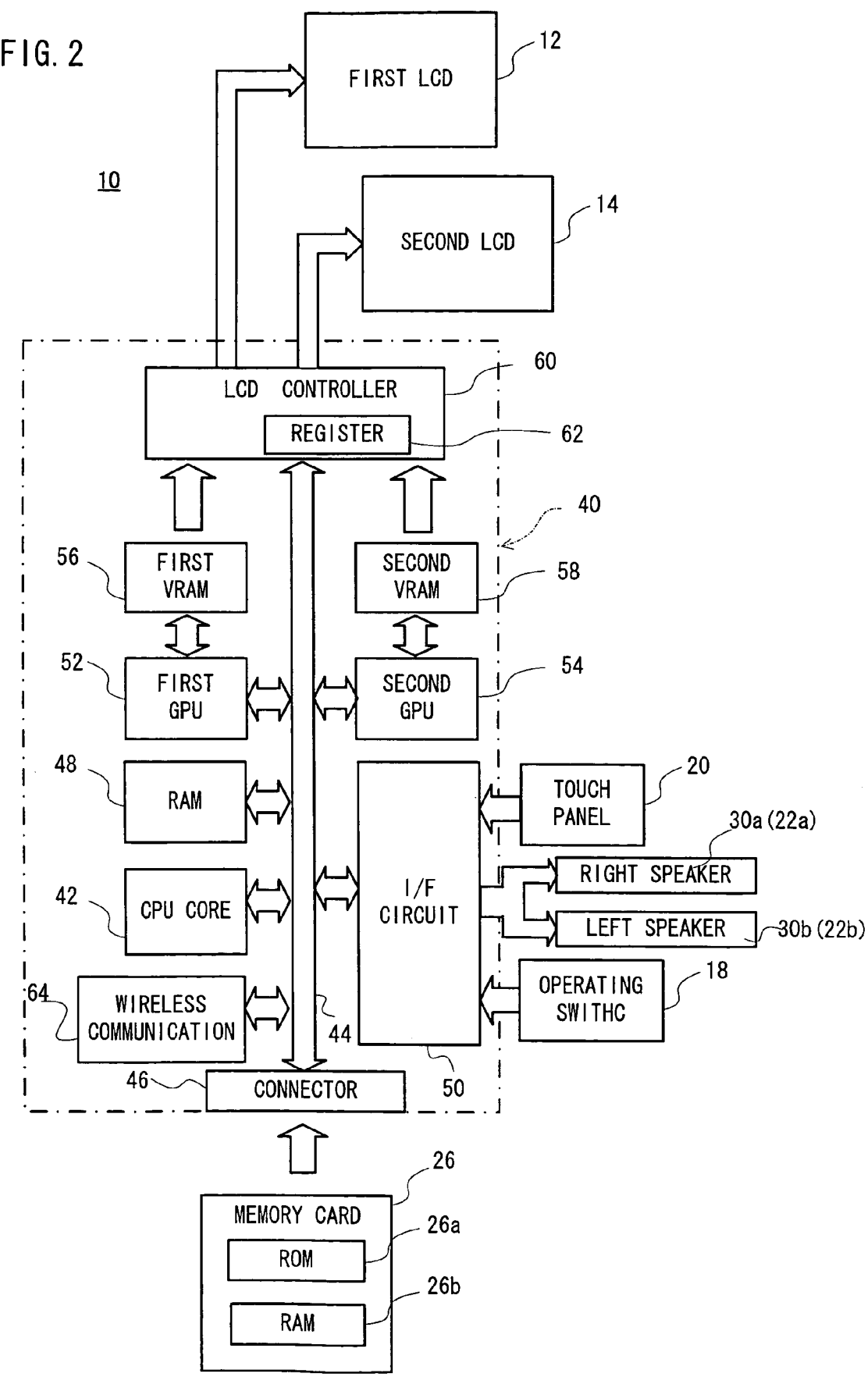
FIG. 2 is a block diagram showing one example of an internal configuration of FIG. 1 embodiment.

FIG. 2 is a block diagram showing an electric configuration of the game apparatus 10. Referring to FIG. 2, the game apparatus 10 includes an electronic circuit card 40, and on the electronic circuit card 40, circuit components of the CPU core 42, etc is mounted. The CPU core 42 is connected with a connector 46, a RAM 48, a first GPU (Graphic Processing Unit) 52, a second GPU 54, an I/F circuit 50, an LCD controller 60, and a wireless communication unit 64 vi a bus 44.

The connector 46 is detachably connected with the memory card 26 as described above. The memory card 26 includes a ROM 26a and a RAM 26b. Although illustration is omitted, the ROM 26a and the RAM 26b are connected with each other via a bus, and also connected with a connector (not shown) to be connected with the connector 46. As a result, the CPU core 42 gains access to the ROM 26a and the RAM 26b.

The ROM 26a stores in advance game programs of the game to be executed by the game apparatus 10, image data like a character image, a background image, an item image, a message image, etc., and sound data like a sound effect, a BGM, an onomatopoeic sound of characters. The backup RAM 26b saves proceeding data and result data of the game.

The RAM 48 is utilized as a buffer memory or a working memory. That is, the CPU core 42 loads the programs and the data like the image data, the sound data, etc. stored in the ROM 26a of the memory card 26 into the RAM 48, and executes the loaded game program. The CPU core 42 stores temporary data, such as game data, flag data, etc. in correspondence with a progress of the game in the RAM 48.

Additionally, the game program and data like the image data, the sound data, etc. are read from the ROM 26a entirely at a time, or partially and sequentially as necessary so as to be stored into the RAM 48.

Each of the GPU 52 and 54 forms a part of a rendering means, and is constructed by a single chip ASIC, for example. When receiving a graphics command (rendering instruction) from the CPU core 42, the GPU 52 or 54 generates game image data according to the graphics command. Here, the CPU core 42 applies an image generation program (included in the game program) required to generate the game image data to both of the GPUs 52 and 54 in addition to the graphics command.

Also, the data (image data like polygon, texture, etc.) required to execute a graphics command is stored in the RAM 48, and obtained by the GPU 52 or 54.

Additionally, the GPU 52 is connected with a VRAM 56, and the GPU 54 is connected with a VRAM 58. The GPU 52 draws the created game image data in the VRAM 56, and the GPU 54 draws the created game image data in the VRAM 58.

The VRAMs 56 and 58 are connected to the LCD controller 60. The LCD controller 60 includes a register 62. The register 62 comprises, for example, one bit, and stores a data value of "0" or "1" according to an instruction of the CPU core 42. The LCD controller 60 outputs the game image data created in the VRAM 56 to the LCD 14 and outputs the game image data created in the VRAM 58 to the LCD 12 in a case that the data value of the register 62 is "0". The LCD controller 60 outputs the image data created in the VRAM 56 to the LCD 12, and outputs the image data created in the VRAM 58 to the LCD 14 in a case that the data value of the register 62 is "1".

The I/F circuit 50 is connected with the operating switch 18, the touch panel 20, the right speaker 30a and the left speaker 30b. Here, the operating switch 18 is the above-described switches 18a, 18b, 18c, 18d, 18e, 18f, 18g, 18h, 18L, and 18R. In response to an operation of the operating switch 18, a corresponding operation signal (operation data) is input to the CPU core 42 through the I/F circuit 50. Furthermore, the coordinates data detected via the touch panel 20 is input to the CPU core 42 via the I/F circuit 50. In addition, the CPU core 42 reads from the RAM 48 the sound data necessary for the game such as a BGM, a sound effect or an onomatopoeic sound of a game character, etc., and outputs it from the speakers 30a and 30b via the I/F circuit 50.

When a match-up mode is selected, a radio signal is sent and received with an opponent's game apparatus through the wireless communication unit 64. That is, the wireless communication unit 64 modulates communication data to the opponent into a radio signal and sends it from an antenna (not illustrated), and receives a radio signal from the opponent's game apparatus by the same antenna to demodulate it to communication data.

Figure 3:
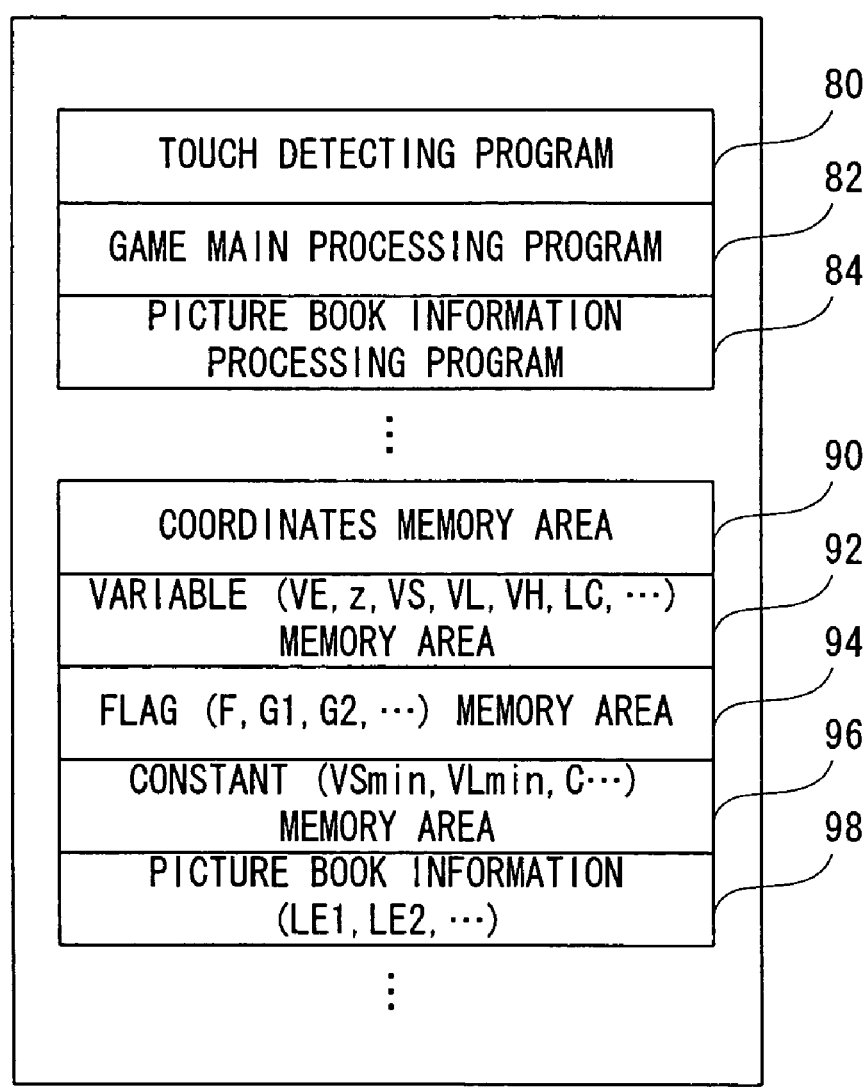
FIG. 3 is an illustrative view showing one example of a mapping state of a RAM applied to FIG. 1 embodiment.

FIG. 3 shows one example of a memory map of the RAM 48. The RAM 48 stores programs loaded from the ROM 26a of the memory card 26. The programs loaded in this embodiment include a touch detecting program 80, a game main processing program 82, a picture book information processing program 84, etc. Although illustration is omitted, various programs required to advance the game, such as a program for generating/outputting images and voices of the game are loaded.

The touch detecting program 80 detects coordinates of the touched point via the touch panel 20. The game main processing program 82 executes a main processing of the game, such as starting the game, advancing the game, winning and losing determination, ending the game, and so on in response to an operation of the operating switch 18 and via the touch panel 20.

Figure 4:
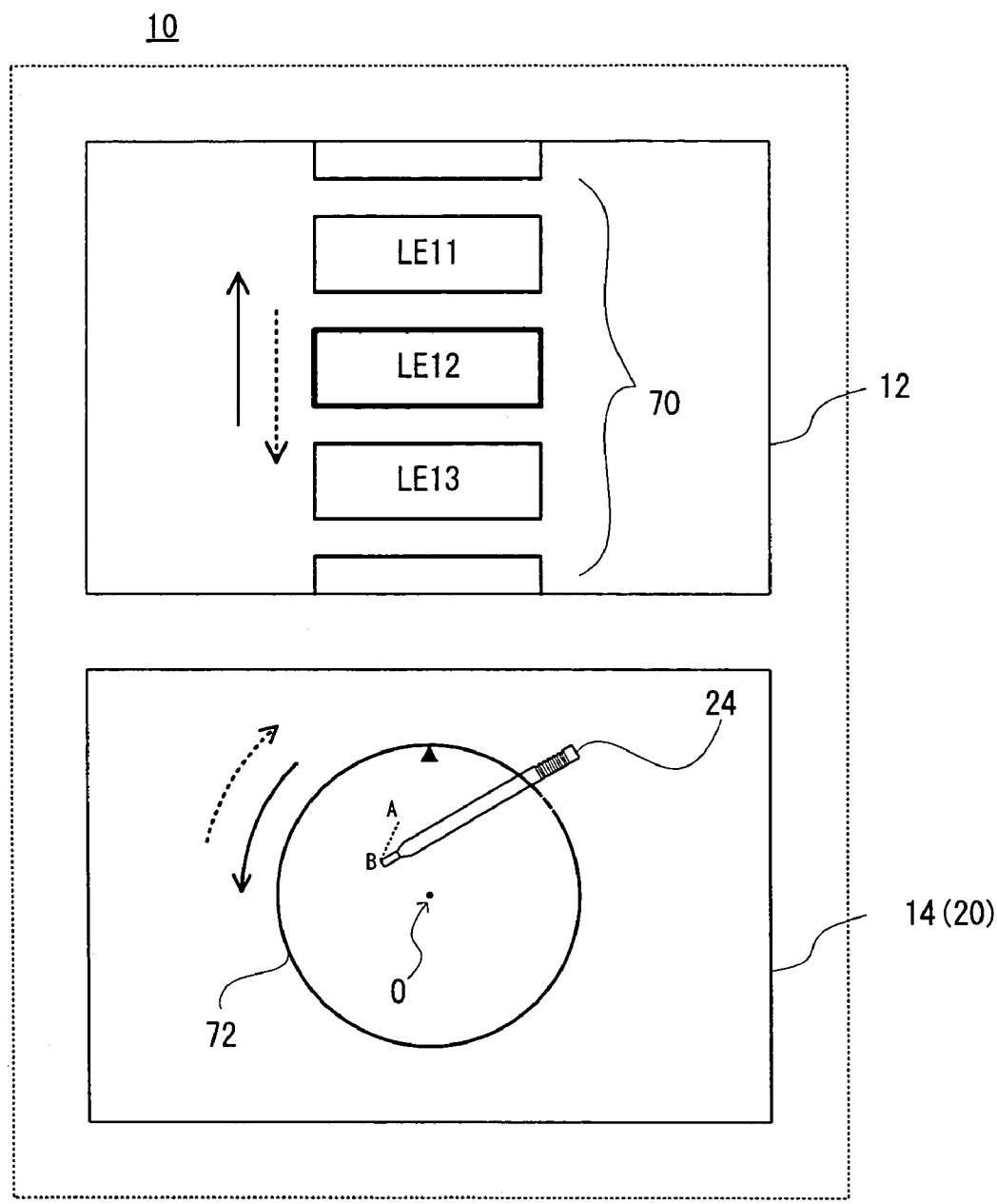
FIG. 4 is an illustrative view showing a display example of an LCD applied to FIG. 1 embodiment.

In the game, the player can refer to a character guide in which picture book information about a plurality of characters are registered. When an operation for calling up the picture book function is performed by the operating switch 18, a list 70 is displayed on the LCD 12, and a wheel 72 is displayed on the LCD 14 as shown in FIG. 4. The list 70 is made up of a plurality of list elements (LE1, LE2, . . . )

respectively corresponding to a plurality of characters, and a part of them (LE11, LE12 and LE13, for example) are displayed on the LCD 12.

The picture book information processing program 84, when a touch operation like rubbing and rotating the wheel 72 with the touch pen 24 is performed in a state that the list 70 and the wheel 72 respectively are displayed on the upper and lower LCDs 12 and 14, the wheel 72 is rotated to the right or to the left, and the list 70 is moved upwardly or downwardly on the basis of a series of touch coordinates (operation vector) detected by the touch detecting program 80 at every unit of time.

More specifically, as shown in FIG. 4, when the player draws an arbitrary straight line on the wheel 72 with the touch pen 24, a touched point A is detected at any time, and after a unit time (1/60 seconds, for example), a point B is further detected. The vector from the point A toward the point B is an operation vector AB, and along the operation vector AB, the wheel 72 rotates to the left, and the list 70 moves upwardly. However, if the orientation of the operation vector is opposite (from the point B toward the point A), the wheel 72 rotates to the right, and the list 70 moves downwardly.

The amount of rotation of the wheel 72 and the amount of movement of the list 70 are calculated from the operation vector AB (see FIG. 5 and FIG. 6 described later). By appropriately rotating the wheel 72 with the touch pen 24 (see FIG. 9 (A)-FIG. 9 (C) described later), the player can move the list 70 such that a desired list element is fit for a defined position P (see FIG. 7 (A)-FIG. 7 (C), FIG. 8 (A) and FIG. 8 (B) described later). When a predetermined operation is performed with the operating switch 18, etc. in a state that a desired list element (LE11, for example) is stop-displayed at the defined position P (see FIG. 8 (B)), picture book information of the character corresponding to the list element is displayed on the LCD 12 (and/or LCD 14).

The RAM 48 further includes a coordinates memory area 90, a variable memory area 92, a flag memory area 94, a constant memory area 96, a picture book memory area 98, etc. The coordinates memory area 90 is an area for storing coordinates of the touched point detected by the touch detecting program 80. The stored coordinates are utilized by the picture book information processing program 84.

The variable memory area 92 is an area for storing variables (VE, VS, VL, VH, LC, etc. described later) to be used by the picture book information processing program 84. The flag memory area 94 is an area for storing flags (F, G1, G2, etc. described later) to be used by the picture book information processing program 84. The constant memory area 96 is an area for storing constants (reduced constant, deceleration constant, transmission constant, initial value, VSmin, VLmin, C, etc. described later) to be used by the picture book information processing program 84. The picture book memory area 98 is an area for storing picture book information to be used by the picture book information processing program 84.

In what follows, a description is made in detail on calculation methods of the amount of rotation of the wheel 72 and the amount of movement of the list 70. First, an effective operation amount VE (absolute value of a tangential component "dist") and a direction of rotation (direction flag F) are calculated from the operation vector AB.

Figure 5:
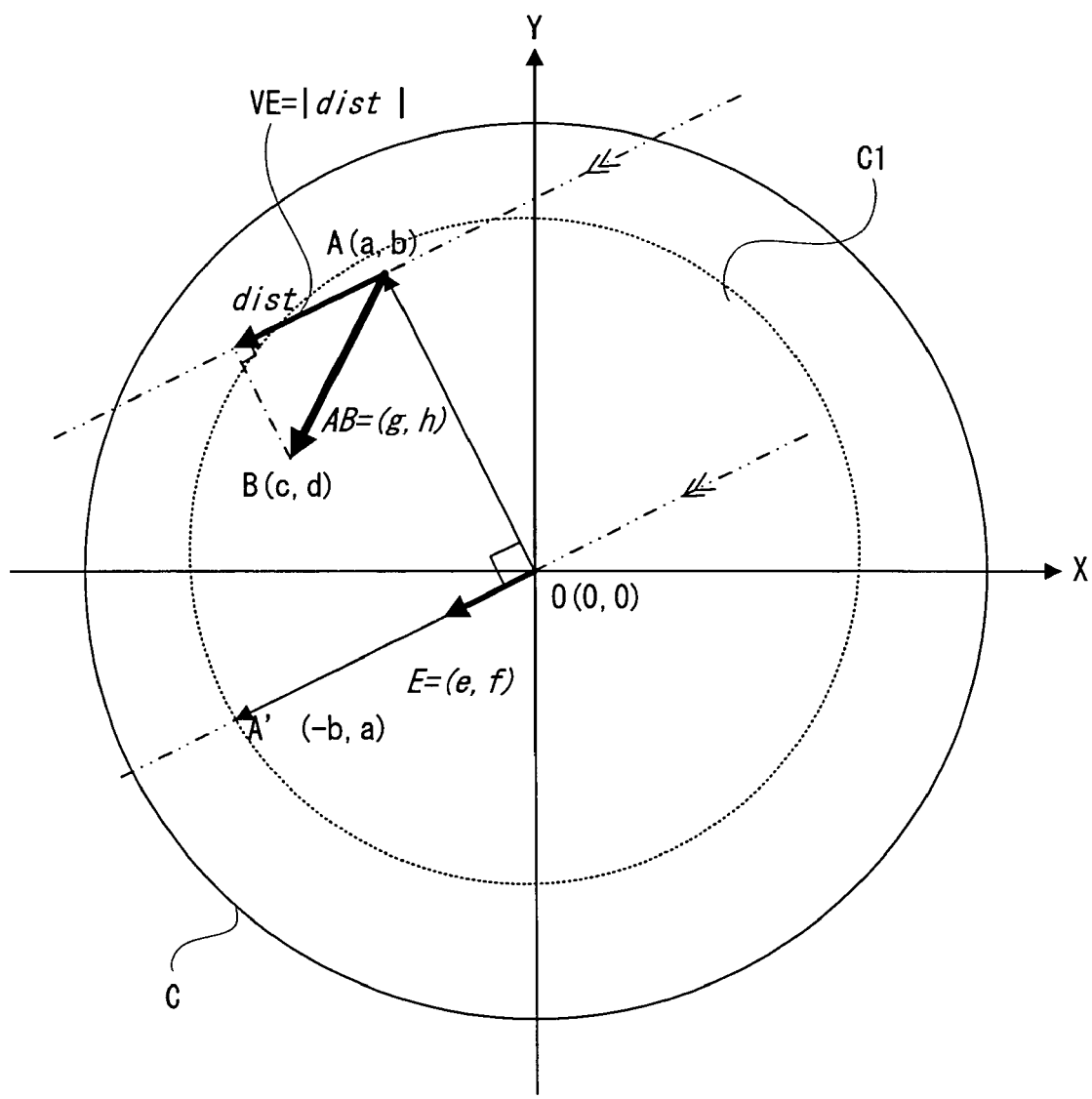
FIG. 5 is an illustrative view showing a direction of rotation and an effective velocity calculating method applied to FIG. 1 embodiment.
Figure 6:
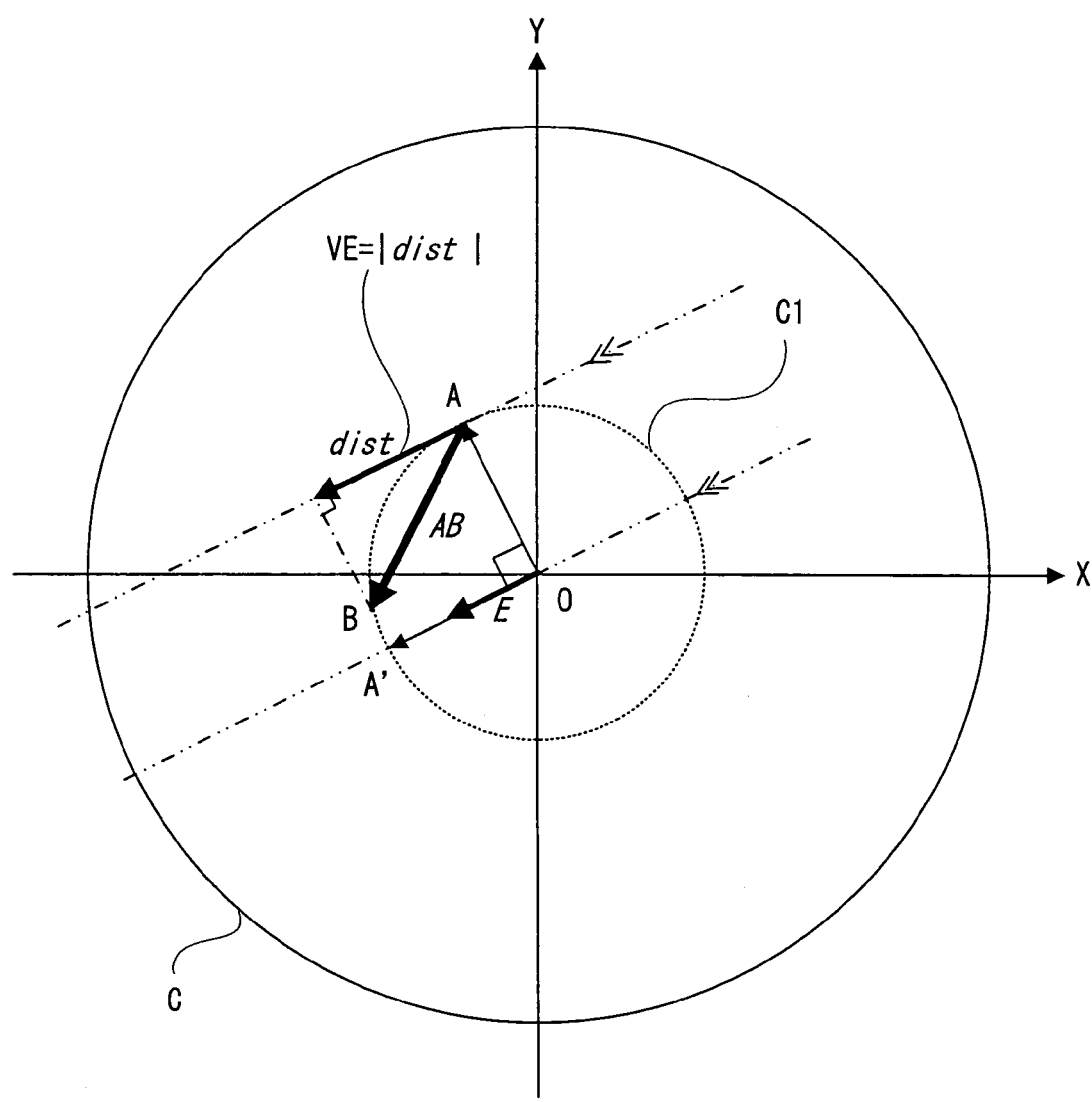
FIG. 6 is an illustrative view showing characteristics of the direction of rotation and the effective velocity calculating method applied to FIG. 1 embodiment by comparing with FIG. 5.

More specifically, with reference to FIG. 5, the origin point O (0, 0) in the XY plane corresponds to the center O (see FIG. 4) of the wheel 72. On the XY plane, a reference circumference C taking the origin point O as its center is defined. Furthermore, the reference circumference C is evaluated by multiplying the periphery of the wheel 72 by a constant, and the larger the constant is, the smaller the amount of rotation of the wheel 72 with respect to the operation amount is.

Where a touched point A (a, b) is detected at any time, and a touched point B (c, d) is further detected after the unit of time, an operation vector AB is calculated to be (c−a, d−b), and the result is represented as (g, h).

On the other hand, a tangent at the point A in the circumference C1 of a circle with OA as its radius is parallel with a vector OA'=(−b, a) vertical to the vector OA, and therefore, by normalizing the vector OA', a unit vector E=(e, f) in parallel with the tangent can be evaluated.

An inner product between the operation vector AB and the unit vector E thus obtained is calculated to obtain a tangential component dist (=e*g+f*h) of the operation vector AB at the point A. The tangential component dist includes a sign, and therefore, the absolute value shall be an effective operation amount VE. Meanwhile, an outer product (this shall be z) between the vector OA and the vector OB is evaluated, and if z>0, F=0 (to the left/upper direction), and if z<0, F=1 (to the right/lower direction).

Also, the direction of rotation can be determined on the basis of the sign of the tangential component dist independent of the sign of the outer product z. That is, if dist>0, F=0, and if dist<0, F=1. In this case, the wheel rotating amount and the list movement amount may directly be calculated from the tangential component dist without separating the tangential component dist into the absolute value (VE) and the sign (F).

Next, a reference velocity VS is evaluated from the effective operation amount VE. More specifically, when a touch operation is started, the evaluated effective operation amount VE is multiplied by a reduced constant (10, for example) to take the resultant as a reference velocity VS. The reference velocity VS is updated at every unit of time on the basis of the effective operation amount VE calculated at every unit of time during the touch operation.

Then, the reference velocity VS is subjected to a process for subtracting deceleration constant (2, for example) irrespective of whether or not the touch operation is being performed at every unit of time. Accordingly, after completion of the touch operation, only the subtraction processing is executed every unit of time, and thus, the reference velocity VS grows smaller from the value directly before completion of the touch operation.

It should be noted that when the reference velocity VS is updated, if VS<VSmin (2, for example), VS=0. By giving an allowance to the reference velocity VS, it is possible to prevent the wheel 72 and the list 70 from slightly moving.

Next, by taking the reference velocity VS as a list movement amount VL, the list 70 is moved by the list movement amount VL in a direction corresponding to the flag F. The ratio (VS/C) of the reference velocity VS to the reference circumference C is multiplied by 360 degrees to thereby obtain a wheel rotating amount VH (=360*VS/C). Then, the wheel 72 is rotated by the wheel rotating amount VL in the orientation corresponding to the flag F.

Thus, in response to the touch operation from the point A to the point B, the wheel 72 rotates to the left at the velocity VH corresponding to the operation vector AB while the list 70 upwardly moves at the velocity corresponding to the operation vector AB. On the contrary thereto, in response to the touch operation from the point B to the point A, the wheel 72 rotates to the right at the velocity VH corresponding to the operation vector BA while the list 70 downwardly moves at the velocity VL corresponding to the operation vector BA.

After completion of the touch operation, the wheel 72 reduces the rotational velocity VH at every unit of time by the deceleration constant as shown in FIG. 9 (A)-FIG. 9 (C) to stop when VH=0. Meanwhile, the list 70 reduces the movement velocity VL at every unit of time by the deceleration constant and stops when VL=0.

However, as to the list 70, if the movement velocity VL is merely reduced by the constant, a desired list element may stop at position displaced from the defined position P. For example, as shown in FIG. 10 (A), assuming that an operation like rotating the wheel 72 to the left (touch operation from the point B to the point A: see FIG. 4) in a state that a list element LE05 is statically displayed at the reference position P, and in response thereto, the list 70 starts to downwardly (F=0) move at a velocity of VL=6.

Figure 10:
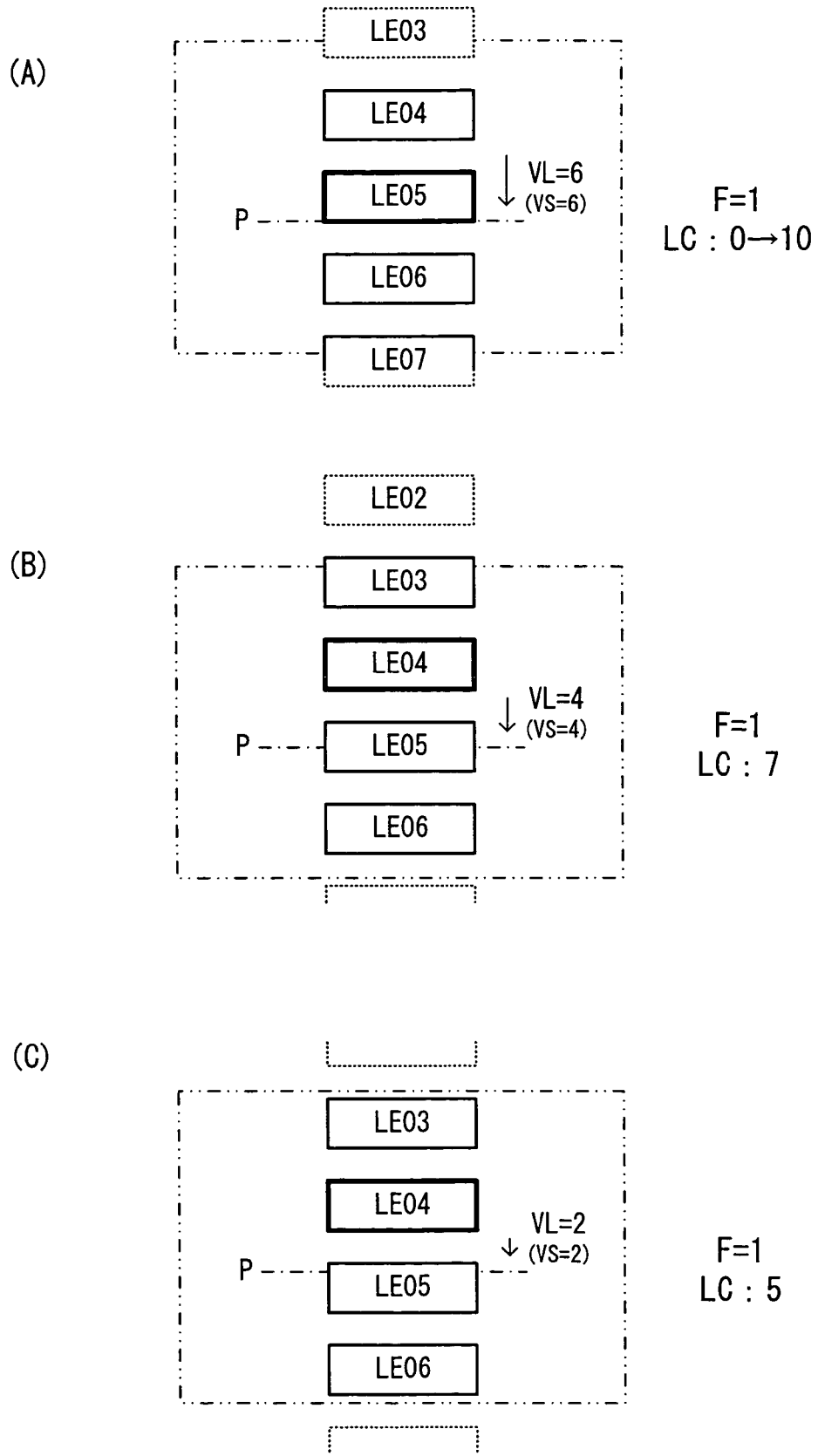
FIG. 10 (A)-FIG. 10 (C) are illustrative views showing another example of the list traveling processing applied to FIG. 1 embodiment in chronologic order.

In this case, the list movement velocity VL reduces by the deceleration constant (=2) at every unit of time according to the reference velocity VS (see FIG. 10 (B) and FIG. 10 (C)). At a time when VS=0 (see FIG. 11 (A)), VL=0, the list 70 should be stopped. However, at this time, a noticed list element LE04 has not yet reached the reference position P. Thus, the list movement velocity VL is maintained at VLmin (=2) until the list element LE04 reaches the reference position P.

A list counter LC is utilized for determining whether or not the noticed list element reaches the reference position P. The list counter LC indicates "0" when any of list elements is statically displayed at the reference position P, and changes to an initial value (10, for example) when the list element is out of the reference position P in response to a touch operation (see FIG. 7 (A)). Successively, the list counter LC decrements according to the movement of the list 70 (see FIG. 7 (B), FIG. 7 (C) and FIG. 8 (A)), and becomes "0" (see FIG. 8 (C)) when a next list element reaches the reference position. Thus, when VL<VLmin (=2), it is determined whether or not LC=0, and if "NO", VL=VLmin until. LC=0, and at a time when LC=0 holds, VL=0.

Thus, for FIG. 11 (A), even if VS=0, LC=4, and therefore, the list 70 moves at a velocity of VL=2. Successively, as shown in FIG. 11 (B), FIG. 11 (C) and FIG. 12 (A), the list counter LC decrements from "3" to "1", but the list 70 continues to move at a velocity of VL=2. Then, as shown in FIG. 12 (B), at a time when LC=0, VL=0, and thus, the list 70 stops at the defined position P.

Consequently, the stopped timing of the list 70 is 7 units of time (see FIG. 12 (B)) from the start of movement (see FIG. 10 (A)). Additionally, the stopped timing of the wheel 72 is the time when reference velocity VS becomes 0, that is, after 3 units of time from the start of movement (see FIG. 11 (A)).

Figure 13:
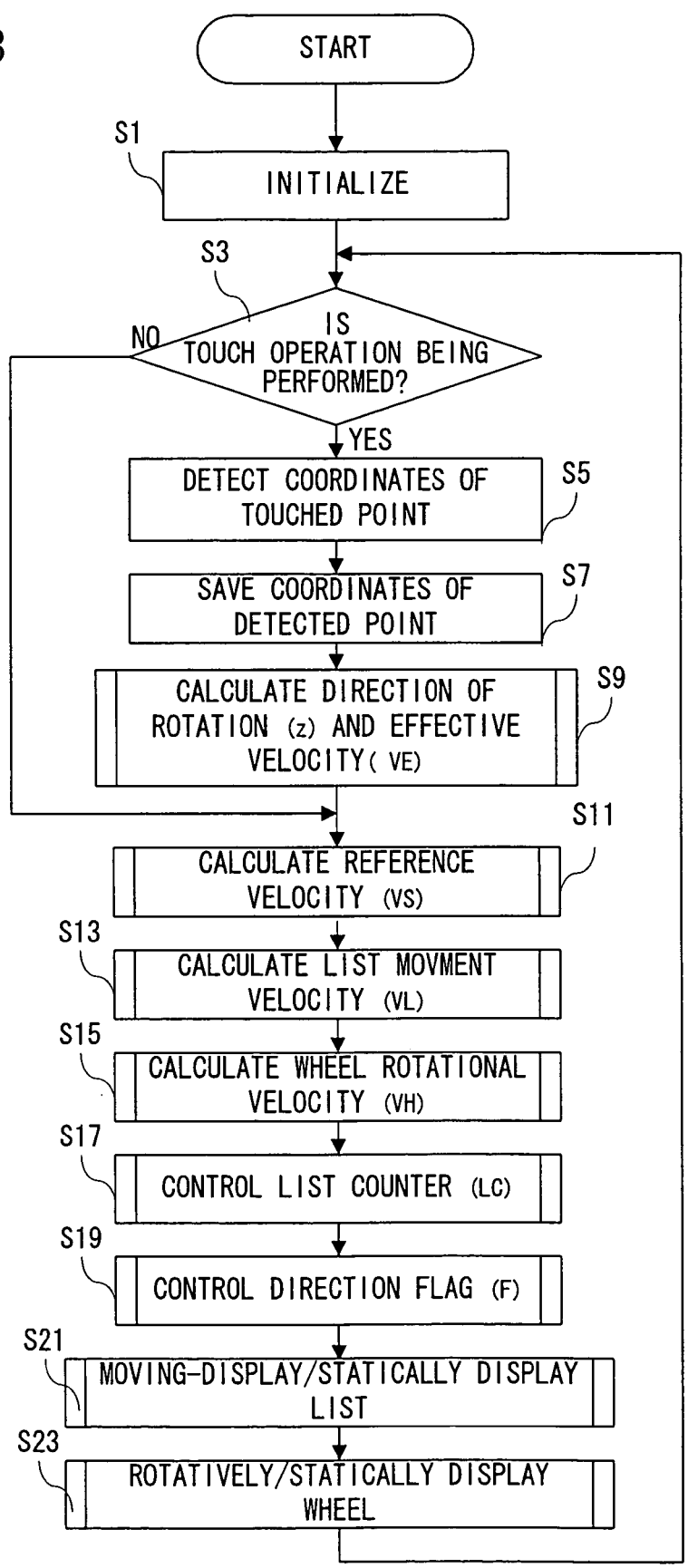
FIG. 13 is a flowchart showing a part of an operation of a CPU core applied to FIG. 1 embodiment.

When controlling the list movement velocity and wheel rotational velocity described above, the CPU core 42 executes processing according to the flowcharts shown in FIG. 13-FIG. 21. Additionally, these flowcharts correspond the touch detecting program 82 and the picture book information processing program 84 (see FIG. 3) in the memory 48. When an operation of calling up the picture book function is performed by means of the operating switch 18, etc., a main routine corresponding to FIG. 13 is activated.

Referring to FIG. 13, in the main routine, initialization is first performed in a step S1. More specifically, the coordinates memory area 90 is cleared, variables in the variable memory area 92 and flags in the flag memory area 94 are reset. In a succeeding step S3, it is determined whether or not the touch operation is being performed, and if "NO", the process proceeds to a step S11. If "YES" in the step S3, the process proceeds to the step S11 through steps S5-S9.

In the step S5, the coordinates of the touched point are detected via the touch panel 20. The detected touched coordinates is saved in the coordinates memory area 90 of the RAM 48 in the next step S7. In the step S9, a direction of rotation (z) and an effective velocity (VE) are calculated on the basis of the information (operation vector) in the coordinates memory area 90.

In the step S11, a reference velocity (VS) is calculated on the basis of the effective velocity. In addition, a list movement velocity (VL) and a wheel rotational velocity (VH) are respectively calculated from the reference velocity in steps S13 and S15. Next, a list counter (LC) is controlled on the basis of the list movement velocity in a step S17, and a direction flag (F) is controlled on the basis of the direction of rotation in a step S19.

Then, the list 70 is moving-displayed or statically displayed in a step S21, the wheel 72 is rotatively displayed or statically displayed in a step S23, and then, the process returns to the step S3. The loop processing of the steps S3-S23 is executed at every unit of time.

Figure 14:
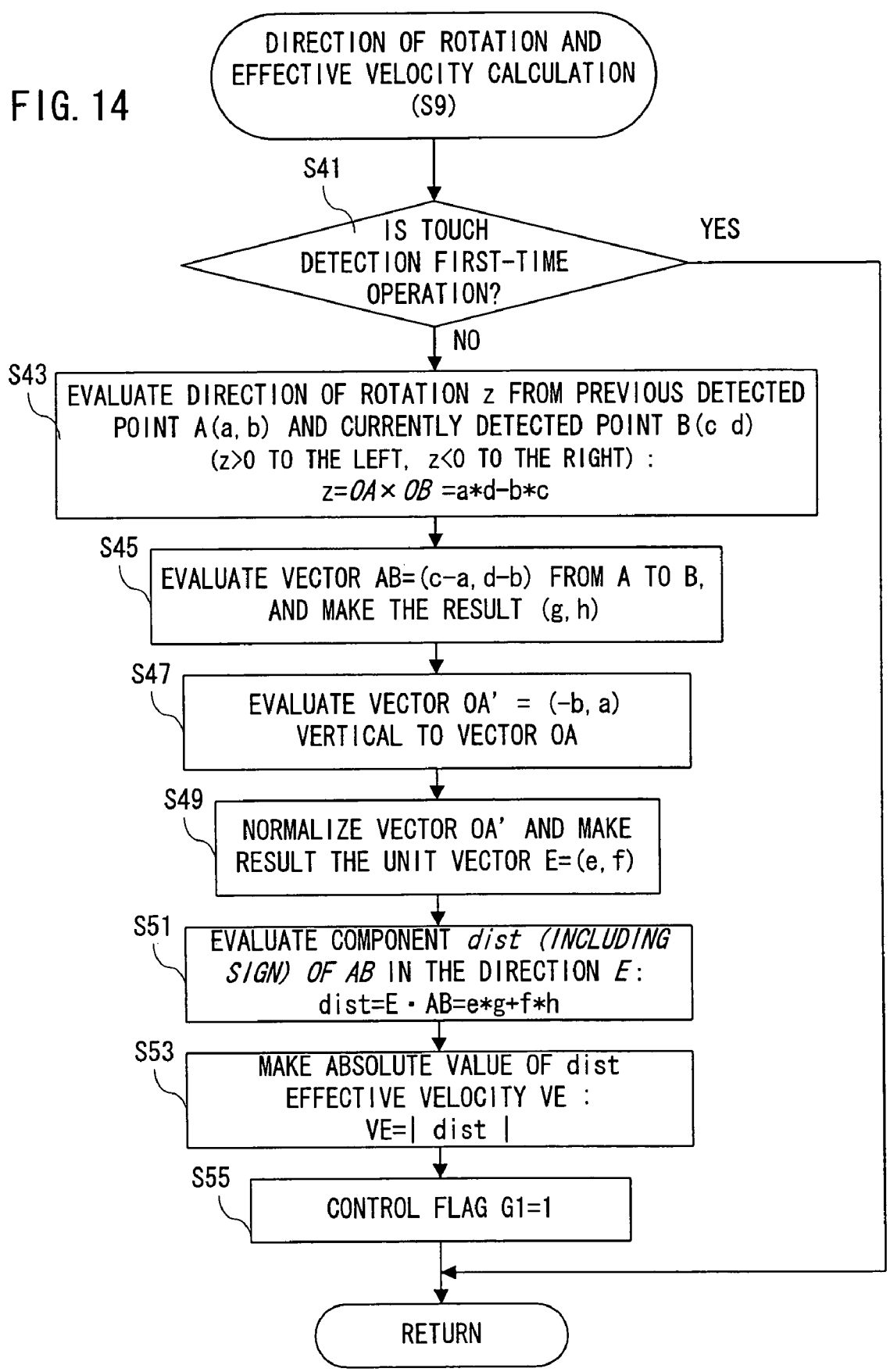
FIG. 14 is a flowchart showing another part of the operation of the CPU core applied to FIG. 1 embodiment.

The direction of rotation and effective velocity calculating processing in the above-mentioned step S9 complies with a subroutine shown in FIG. 14. With reference to FIG. 14 and FIG. 5, in a step S41, it is determined whether or not the touch detection in the step S5 is a first-time operation. If the coordinates of the previous touched point and the coordinates of the current touched point are stored in the coordinates memory area 90 of the RAM 48, "YES" is determined in the step S41, and the process in a step S43 and the onward are executed. If "NO" in the step S41, the process is restored to the main routine.

In the step S43, a direction of rotation z is evaluated on the basis of the coordinates (a, b) of the previous touched point A and the coordinates (c, d) of the current touched point B. Here, the direction of rotation z is calculated as an outer product (a*d−b*c) between the vector OA and the vector OB, where a positive value means to the left, and a negative value means to the right.

In a step S45, an operation vector AB=(c−a, d−b) is obtained, and the result shall be (g, h). In a step S47, a vector OA'=(−b, a) vertical to the vector OA is evaluated. In a step S49, the vector OA' is normalized, and the result shall be a unit vector E=(e, f). In a step S51, an inner product (e*g+f*h) between the operation vector AB and the unit vector E is evaluated, and the result shall be an effective operation amount dist. In a step S53, an absolute value of the effective operation amount dist is evaluated, and the result shall be an effective velocity VE.

Thus, after the effective velocity VE is evaluated from the operation vector AB, in a step S55, a control flag G1 is made to "1", and then, the process returns to the main routine.

Figure 15:
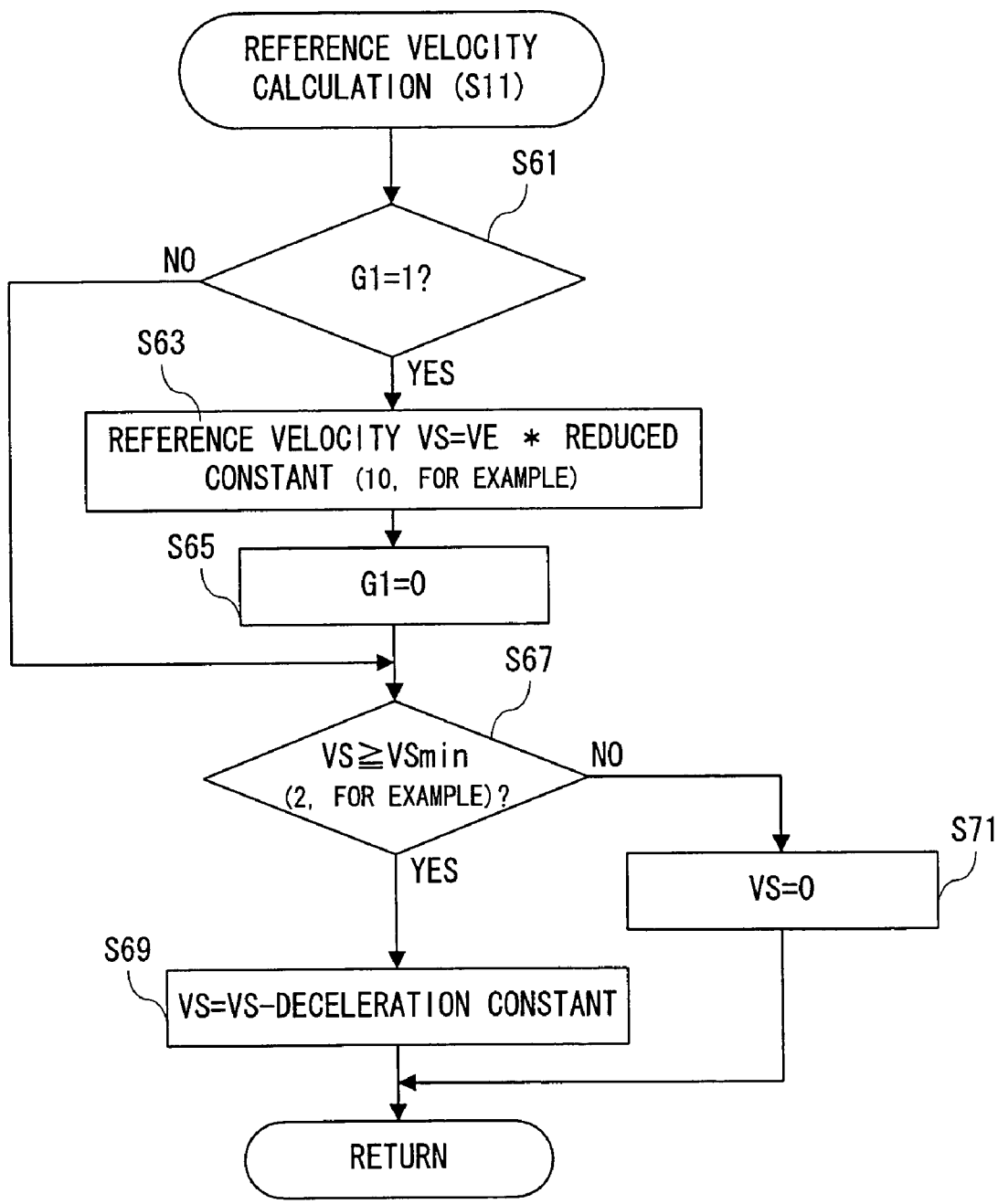
FIG. 15 is a flowchart showing the other example of the operation of the CPU core applied to FIG. 1 embodiment.

The reference velocity calculating processing in the above-mentioned step S11 complies with a subroutine in FIG. 15. Referring to FIG. 15, it is determined whether or not the control flag G1 is "1" in a step S61, and if "NO", the process proceeds to a step S67. If "YES" in the step S61, the effective velocity VE is multiplied by the reduced constant (10, for example) in a step S63, and the result shall be the reference velocity VS. Then, in a step S65, after G1=0, the process proceeds to the step S67.

In the step S67, it is determined whether or not the reference velocity VS is equal to or more than a minimum reference velocity VSmin (2, for example), and if "YES" here, the deceleration constant is subtracted from the reference velocity VS in a step S69, and then, the process is restored to the main routine. If "NO" in the step S67, VS=0 in a step S71, and then, the process is restored to the main routine.

Figure 16:
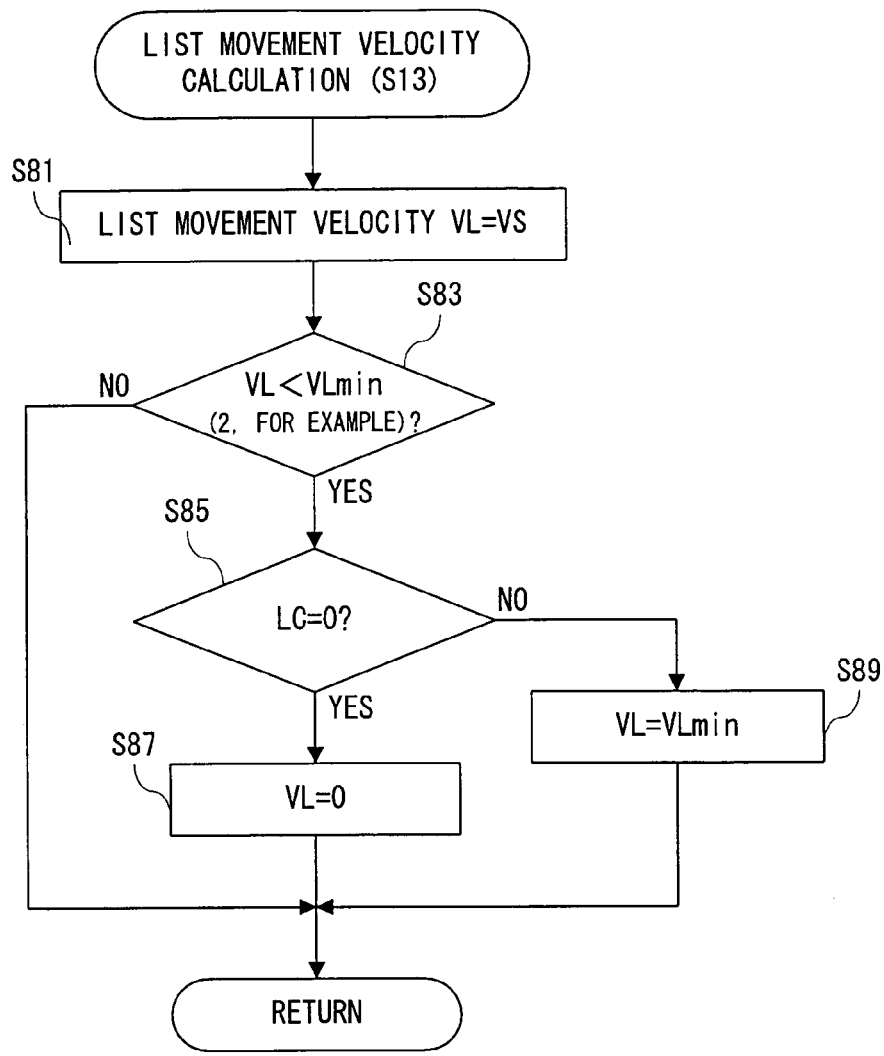
FIG. 16 is a flowchart showing a further part of the operation of the CPU core applied to FIG. 1 embodiment.

The list movement velocity calculating process in the above-mentioned step S13 complies with a subroutine shown in FIG. 16. With reference to FIG. 16, in a step S81, the reference velocity VS is regarded as a list movement velocity VL. In a step S83, it is determined whether or not the list movement velocity VL is less than a minimum movement velocity VLmin, and if "NO", that is, if VL≧VLmin, the process is restored to the main routine.

If "YES" in the step S83, it is determined whether or not the list counter LC is "0" in a step S85, and if "YES" here, VL=0 in a step S87, and then, the process is restored to the main routine. If "NO" in the step S85, VL=VLmin in a step S89, and then, the process is restored to the main routine.

Figure 17:
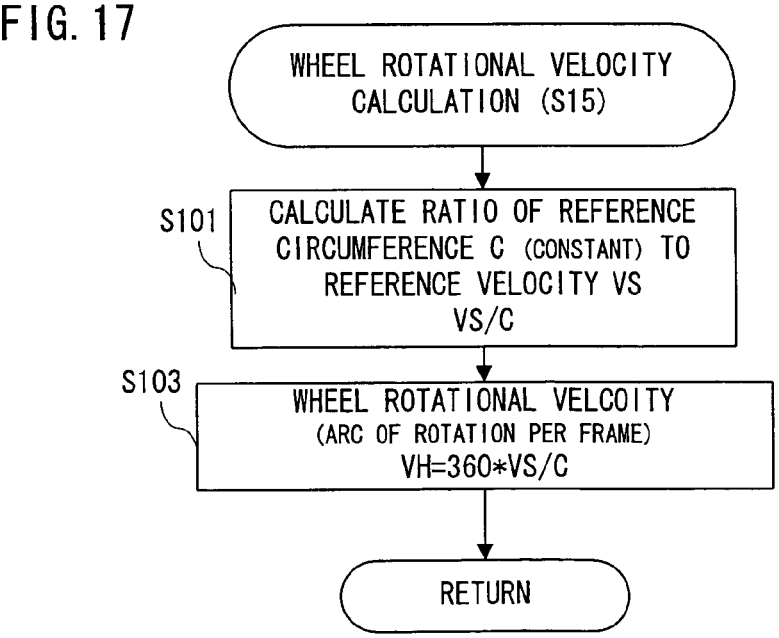
FIG. 17 is a flowchart showing another part of the operation of the CPU core applied to FIG. 1 embodiment.

A wheel rotational velocity calculating processing in the above-mentioned step S15 complies with a subroutine shown in FIG. 17. With reference to FIG. 17, in a step S101, the ratio (=VS/C) of the reference circumference C (constant: see FIG. 5 and FIG. 6) to the reference velocity VS (=VE*reduced constant) is evaluated. In a step S103, the evaluated ratio is multiplied by 360 degrees, and the result shall be a wheel rotational velocity VH (=360*VS/C). Then, the process is restored to the main routine.

Figure 18:
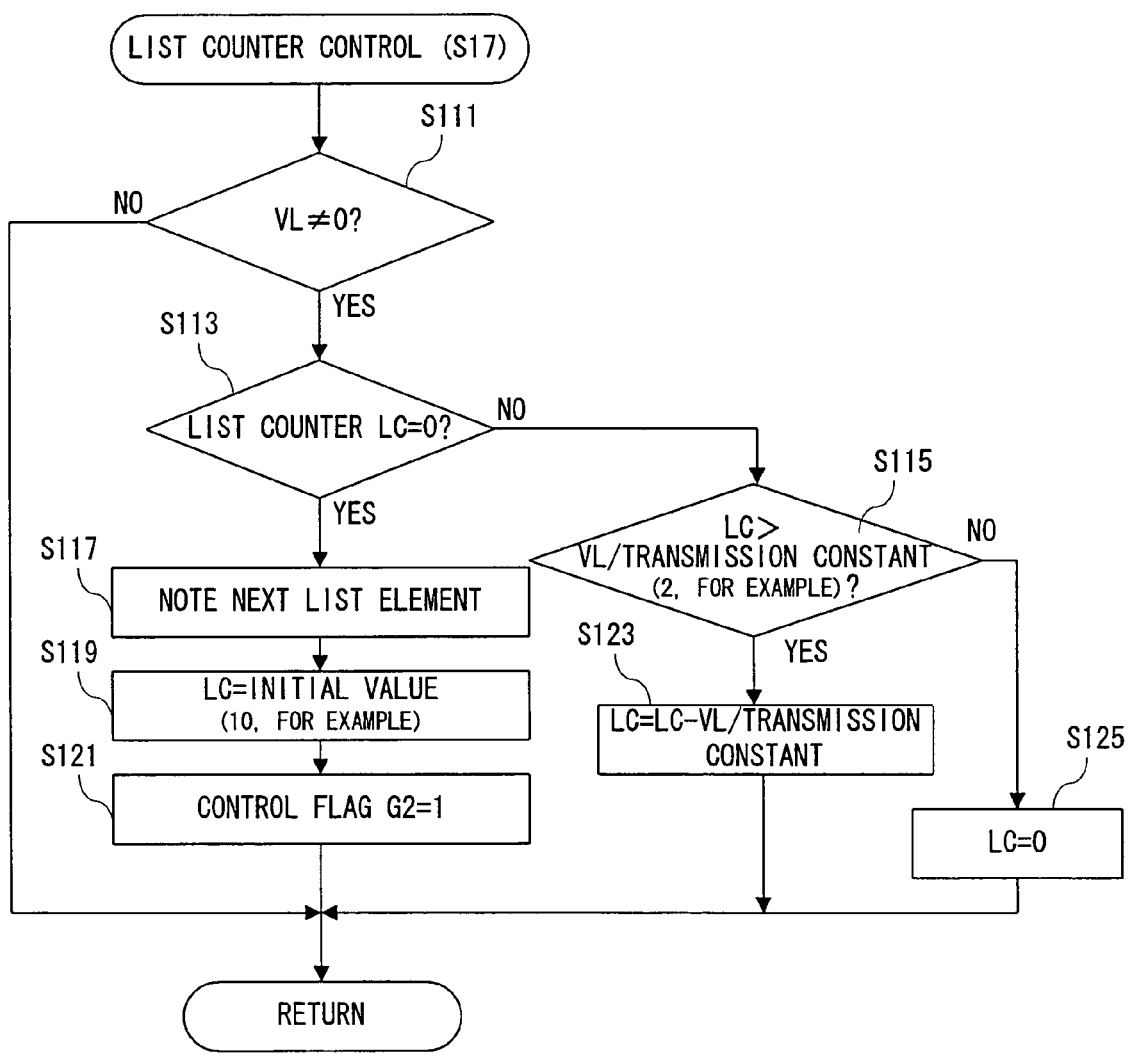
FIG. 18 is a flowchart showing the other part of the operation of the CPU core applied to FIG. 1 embodiment.

The list counter controlling processing in the above-mentioned step S17 complies with a subroutine shown in FIG. 18. With reference to FIG. 18, in a step S111, it is determined whether or not the list movement velocity VL is not "0", and if "NO", that is, if VL=0, the process is restored to the main routine. If "YES" in the step S111, it is determined whether or not the list counter LC is "0" in a step S113. If "NO" here, it is further determined whether or not the list counter LC is larger than the result obtained by subtracting the transmission constant (2, for example) from the list movement velocity VL in a step S115. If "NO" in the step S115, LC=0 in a step S125, and the process is restored to the main routine.

If "YES" in the step S113, a next list element is noticed in a step S117, an initial value (10, for example) is set to the list counter LC in a step S119, the control flag G2 is set to "1" in a step S121, and then, the process is restored to the main routine. If "YES" in the step S115, {VL/transmission constant} is subtracted from the list counter LC in a step S123, and then, the process is restored to the main routine.

Figure 19:
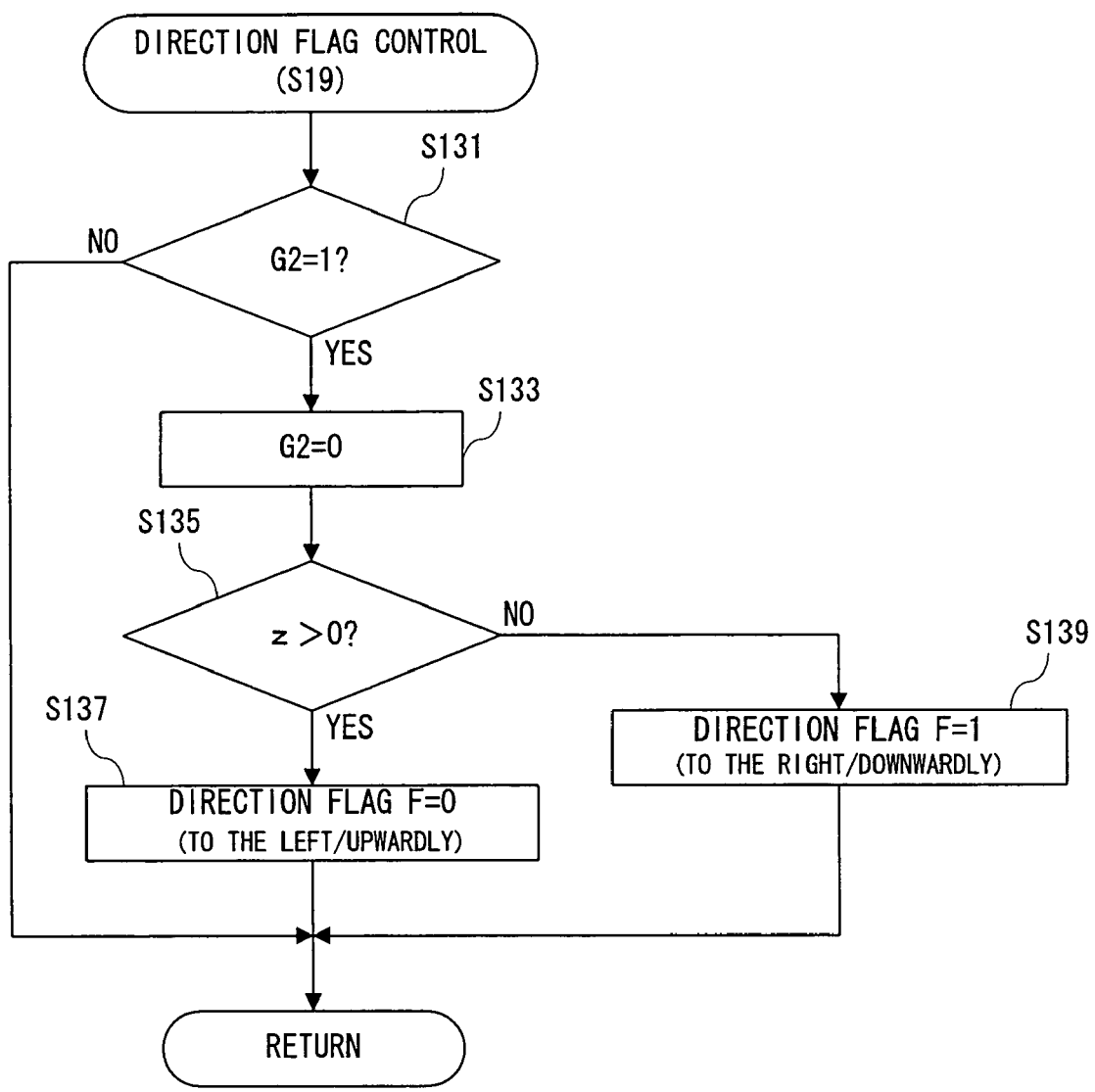
FIG. 19 is a flowchart showing a further part of the operation of the CPU core applied to FIG. 1 embodiment.

The direction flag controlling processing in the above-mentioned step S19 complies with a subroutine shown in FIG. 19. With reference to FIG. 19, in a step S131, it is determined whether or not the control flag G2 is "1", and if "NO", the process is restored to the main routine. If "YES" in the step S131, G2=0 in a step S133, and the process shifts to a step S135. In the step S135, it is determined whether or not the direction of rotation z is larger than "0", and if "YES" here, the direction flag F is set to "0" in a step S137, and then, the process is restored to the main routine. If "NO" in the step S135, the direction flag F is set to "1" in a step S139, and then, the process is restored to the main routine.

Figure 20:
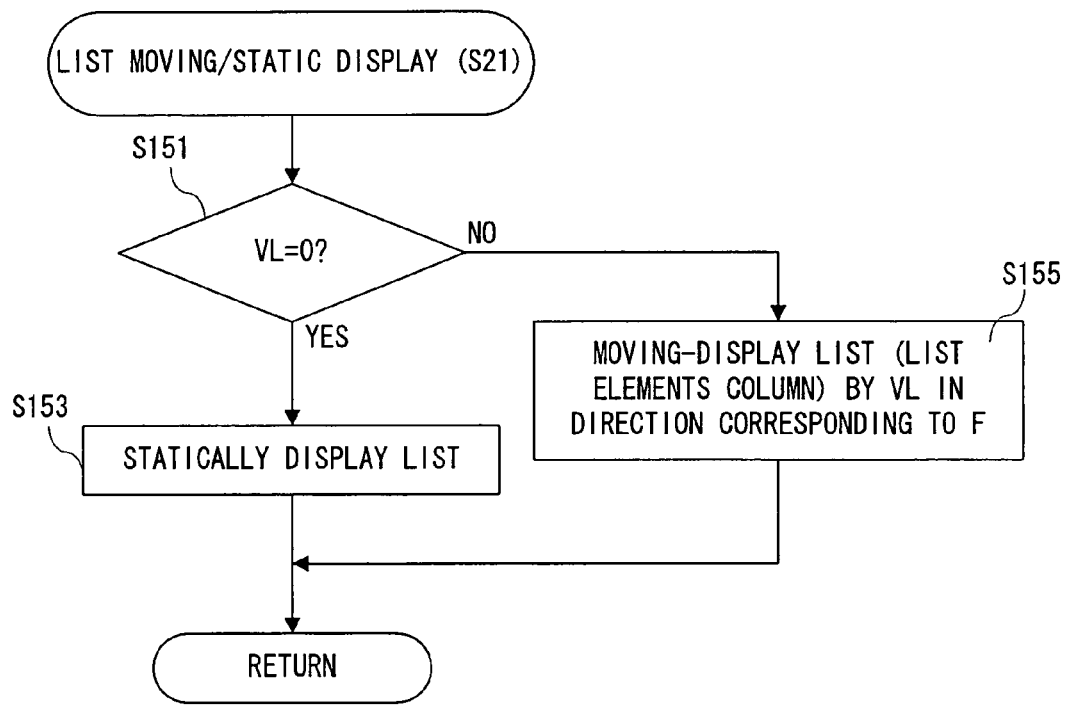
FIG. 20 is a flowchart showing another part of the operation of the CPU core applied to FIG. 1 embodiment.

The list moving/static display processing in the above described step S21 complies with a subroutine shown in FIG. 20. With reference to FIG. 20, in a step S151, it is determined whether or not the list movement velocity VL is "0", and if "YES", the list 70 is statically displayed in a step S153, and then, the process is restored to the main routine. If "NO", in the step S155, the list 70 is moving-displayed in a direction corresponding to the direction flag F (for F=0, upper direction and for F=1, lower direction) by the list movement velocity VL, and then, the process is restored to the main routine.

Figure 21:
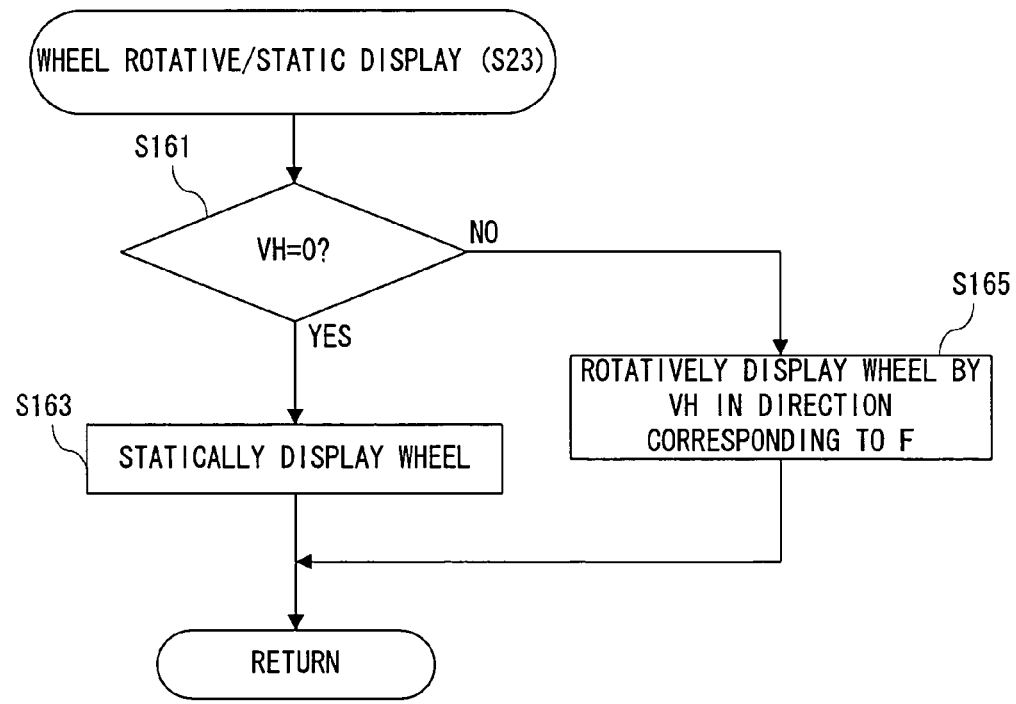
FIG. 21 is a flowchart showing the other example of the operation of the CPU core applied to FIG. 1 embodiment.

The wheel rotatively/statically display processing in the above-mentioned step S23 complies with a subroutine shown in FIG. 21. With reference to FIG. 21, it is determined whether or not the wheel rotational velocity VH is "0" in a step S161, and if "YES", the wheel 72 is statically displayed in a step S163, and then, the process is restored to the main routine. If "NO", the wheel 72 is rotatively displayed in the direction corresponding to the direction flag F (for F=0, to the left, and for F=1, to the right) by the wheel rotational velocity VH in a step S165, and then, the process is restored to the main routine.

As understood from the above, in this embodiment, the game apparatus 10 is provided with the touch panel 20 for designating a position of an arbitrary point with respect to the reference point O. The CPU core 42 of the game apparatus 10 detects a position of the point designated by the touch panel 20 with respect to the reference point O at every unit of time (S5), and calculates an operation vector AB respectively taking the point A and the point B detected before and after as a starting point and an ending point (S45). Then, the calculated operation vector AB is orthogonally projected to the straight line vertical to the vector OA respectively taking the reference point O and the point A as a starting point and an ending point (S47-S51), and moves the images, that is, the wheel 72 and the list 70 on the basis of the component vector (effective operation amount) dist thus obtained from the operation vector AB (S11-S23).

According to this embodiment, if a travel distance from the points designated by the pointing device, that is, a operation amount is equal, the same component vector can be obtained regardless of the distances from the reference point to the designated points, and therefore, an operator can move the images by the desired amount without adjusting the operation amount by taking the distance from the reference point to the designated points into consideration. Furthermore, by regarding an arbitrary operation as a rotating operation, the component vector is calculated at a time the two points are detected, capable of improving a response. Thus, it is possible to precisely and responsively move an image in response to a rotating operation.

In the above, a description is made on the game apparatus 10, having the touch panel 20, which can move an image in response to a rotating operation via the touch panel as one example. However, the present example embodiment can be applied to an information processing apparatus (personal computer, PDA, electronic notepad/dictionary, home information equipment, etc.), having a pointing device (touch panel, tablet, mouse, etc.), which can perform information processing in response to the rotating operation by means of it.

Although the present example embodiments have been described and illustrated in detail, it is clearly understood that the same is by way of illustration and example only and is not to be taken by way of limitation, the spirit and scope of the present invention being limited only by the terms of the appended claims.

What is claimed is:

1. A recording medium recording an information processing program, wherein said information processing program causes a processor of an information processing apparatus with a pointing device for designating a position of an arbitrary point to execute a method comprising:

detecting a position designated by said pointing device with respect to a reference point at every unit of time;

calculating an operation vector respectively regarding a first point and a second point detected before and after by said position detecting as a starting point and an ending point;

orthogonally-projecting the calculated operation vector onto a straight line vertical to the first vector respectively regarding said reference point and said first point as a starting point and an ending point; and processing information on the basis of a component vector obtained from said operation vector by processing in said orthogonally-projecting.

2. A recording medium recording an information processing program according to claim 1, wherein said orthogonally-projecting includes calculating an unit vector vertical to said first vector; and calculating an inner product between the calculated operation vector and the calculated unit vector.

3. A recording medium recording an information processing program according to claim 2, wherein
said information processing program causes said processor to further execute:
calculating an absolute value of the calculation by said inner product calculating; and
calculating an outer product between said first vector and a second vector regarding said reference point and said second point as a starting point and an ending point, and
said processing information includes performing information processing on the basis of the calculated absolute value and said calculated outer product.

4. A recording medium recording an information processing program according to claim 1, wherein
said information processing apparatus further comprising a display for displaying an image, and
said processing information includes moving an image displayed on said display in a direction corresponding to the orientation of the component vector obtained from said operation vector by an amount corresponding to the size of the component vector.

5. A recording medium recording an information processing program according to claim 4, wherein said processing information includes: multiplying the size of the component vector obtained from said operation vector by a constant, and retaining the result of the multiplication as a reference velocity; and performing deceleration processing on the reference velocity retained by said retaining the result of the multiplication at every unit of time.

6. A recording medium recording an information processing program according to claim 5, wherein said processing information further includes: determining whether or not the reference velocity retained by said retaining is equal to or more than a threshold value; and a changing the reference velocity to zero when the reference velocity is determined to be less than the threshold value.

7. A recording medium recording an information processing program according to claim 6, wherein said processing information includes: determining whether or not said image exists at a defined position when said velocity determining determines that the reference velocity is less than the threshold value; and moving said image to said defined position when said position determining step-determines that said image does not exist at said defined position, and then stopping it.

8. A recording medium recording an information processing program according to claim 4, wherein
said image includes a first image and a second image,
said processing information includes:
rotating said first image in a direction corresponding to the orientation of the component vector obtained from said operation vector by an angle corresponding to the size of said component vector; and
translating said second image in a direction corresponding to the orientation of the component vector obtained from said operation vector by a distance corresponding to the size of the component vector.

9. An information processing apparatus, comprising:
a pointing device for designating a position of an arbitrary point;
a position detector for detecting a position designated by said pointing device with respect to a reference point at every unit of time;
an operation vector calculator for calculating an operation vector respectively regarding a first point and a second point detected before and after by said position detector as a starting point and an ending point;
an orthogonally projector for orthogonally-projecting the operation vector calculated by said operation vector calculator onto a straight line vertical to the first vector respectively regarding said reference point and said first point as a starting point and an ending point; and
an information processor for processing information on the basis of a component vector obtained from said operation vector by the orthogonally-projecting processing in said orthogonally projector.

10. A information processing apparatus according to claim 9, wherein
said information processing apparatus further comprising a display for displaying an image, and
said information processor moves an image displayed on said display in a direction corresponding to the orientation of the component vector obtained from said operation vector by an amount corresponding to the size of the component vector;
said information processor performs: multiplying the size of the component vector obtained from said operation vector by a constant, and retaining the result of the multiplication as a reference velocity; and deceleration processing on the reference velocity retained by said retaining at every unit of time.

11. A information processing apparatus according to claim 10, wherein said information processor performs: determining whether or not the reference velocity retained by said retaining is equal to or more than a threshold value; and changing the reference velocity to zero when it is determined that the reference velocity is less than the threshold value.

12. A information processing apparatus according to claim 11, wherein said information processor performs: determining whether or not said image exists at a defined position when said velocity determining determines that the reference velocity is less than the threshold value; and moving said image to said defined position when said position determining determines that said image does not exist at said defined position, and then stopping it.

13. A information processing apparatus according to claim 9, wherein
said information processing apparatus further comprising a display for displaying an image, and
said information processor moves an image displayed on said display in a direction corresponding to the orientation of the component vector obtained from said operation vector by an amount corresponding to the size of the component vector;
said image includes a first image and a second image,
said information processor performs:
rotating said first image in a direction corresponding to the orientation of the component vector obtained from said operation vector by an angle corresponding to the size of said component vector; and
translating said second image in a direction corresponding to the orientation of the component vector obtained from said operation vector by a distance corresponding to the size of the component vector.

14. A information processing apparatus according to claim 9, wherein said orthogonally-projector calculates an unit vector vertical to said first vector; and calculates an inner product between the calculated operation vector and the calculated unit vector.

15. An information processing method of an information processing apparatus with a pointing device for designating a position of an arbitrary point, comprising:
    detecting a position designated by said pointing device with respect to a reference point at every unit of time;
    calculating an operation vector respectively regarding a first point and a second point detected before and after by said position detecting as a starting point and an ending point;
    orthogonally-projecting the calculated operation vector onto a straight line vertical to the first vector respectively regarding said reference point and said first point as a starting point and an ending point; and
    processing information on the basis of a component vector obtained from said operation vector by processing in said orthogonally-projecting.

16. A method according to claim 15, wherein
    said information processing apparatus further comprising a display for displaying an image, and
    said processing information includes moving an image displayed on said display in a direction corresponding to the orientation of the component vector obtained from said operation vector by an amount corresponding to the size of the component vector;
    said processing information includes: multiplying the size of the component vector obtained from said operation vector by a constant, and retaining the result of the multiplication as a reference velocity; and performing deceleration processing on the reference velocity retained by said retaining the result of the multiplication at every unit of time.

17. A method according to claim 16, wherein said processing information further includes: determining whether or not the reference velocity retained by said retaining is equal to or more than a threshold value; and changing the reference velocity to zero when the reference velocity is determined to be less than the threshold value.

18. A method according to claim 17, wherein said processing information includes: determining whether or not said image exists at a defined position when said velocity determining determines that the reference velocity is less than the threshold value; and moving said image to said defined position when said position determining determines that said image does not exist at said defined position, and then stopping it.

19. A method according to claim 15, wherein
    said information processing apparatus further comprising a display for displaying an image, and
    said processing information includes moving an image displayed on said display in a direction corresponding to the orientation of the component vector obtained from said operation vector by an amount corresponding to the size of the component vector;
    said image includes a first image and a second image,
    said processing information includes:
    rotating said first image in a direction corresponding to the orientation of the component vector obtained from said operation vector by an angle corresponding to the size of said component vector; and
    translating said second image in a direction corresponding to the orientation of the component vector obtained from said operation vector by a distance corresponding to the size of the component vector.

20. A method according to claim 15, wherein said orthogonally-projecting includes calculating an unit vector vertical to said first vector; and calculating an inner product between the calculated operation vector and the calculated unit vector.

* * * * *